June 3, 1958 H. M. KONRAD ET AL 2,837,275
CONTROL OF TOTALIZER SELECTING MECHANISM BY THE TOTALIZER
Filed Oct. 23, 1953 7 Sheets-Sheet 1
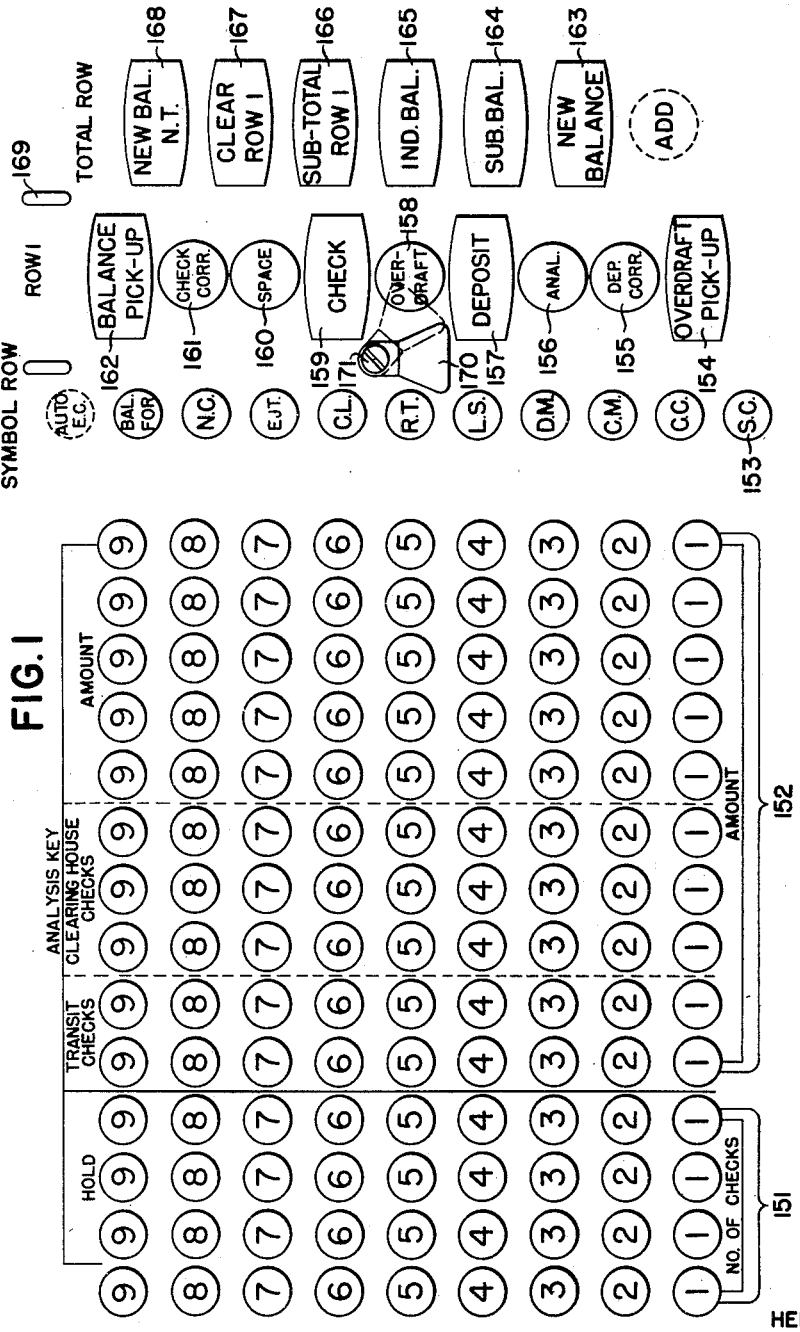
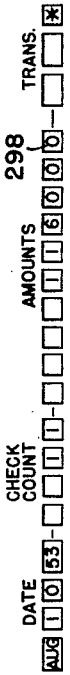
INVENTORS
HERMAN M. KONRAD
RUDOLPH J. MOSER
BY
THEIR ATTORNEYS

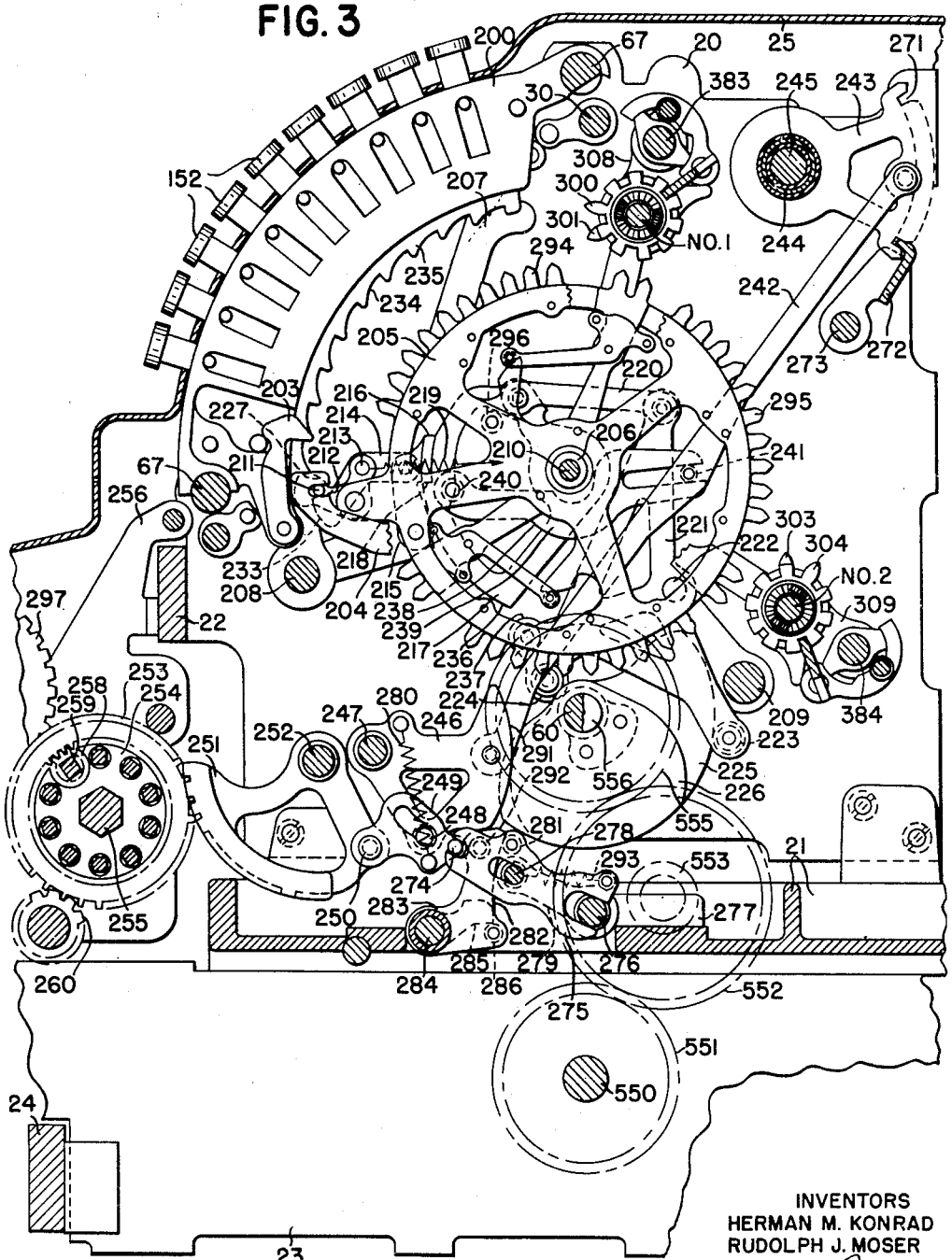

June 3, 1958  H. M. KONRAD ET AL  2,837,275
CONTROL OF TOTALIZER SELECTING MECHANISM BY THE TOTALIZER
Filed Oct. 23, 1953  7 Sheets-Sheet 3
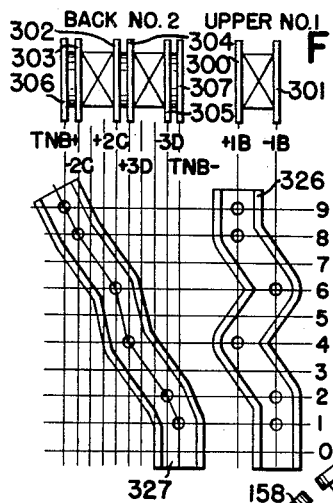
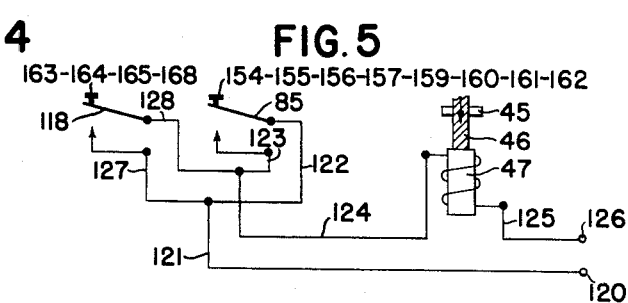
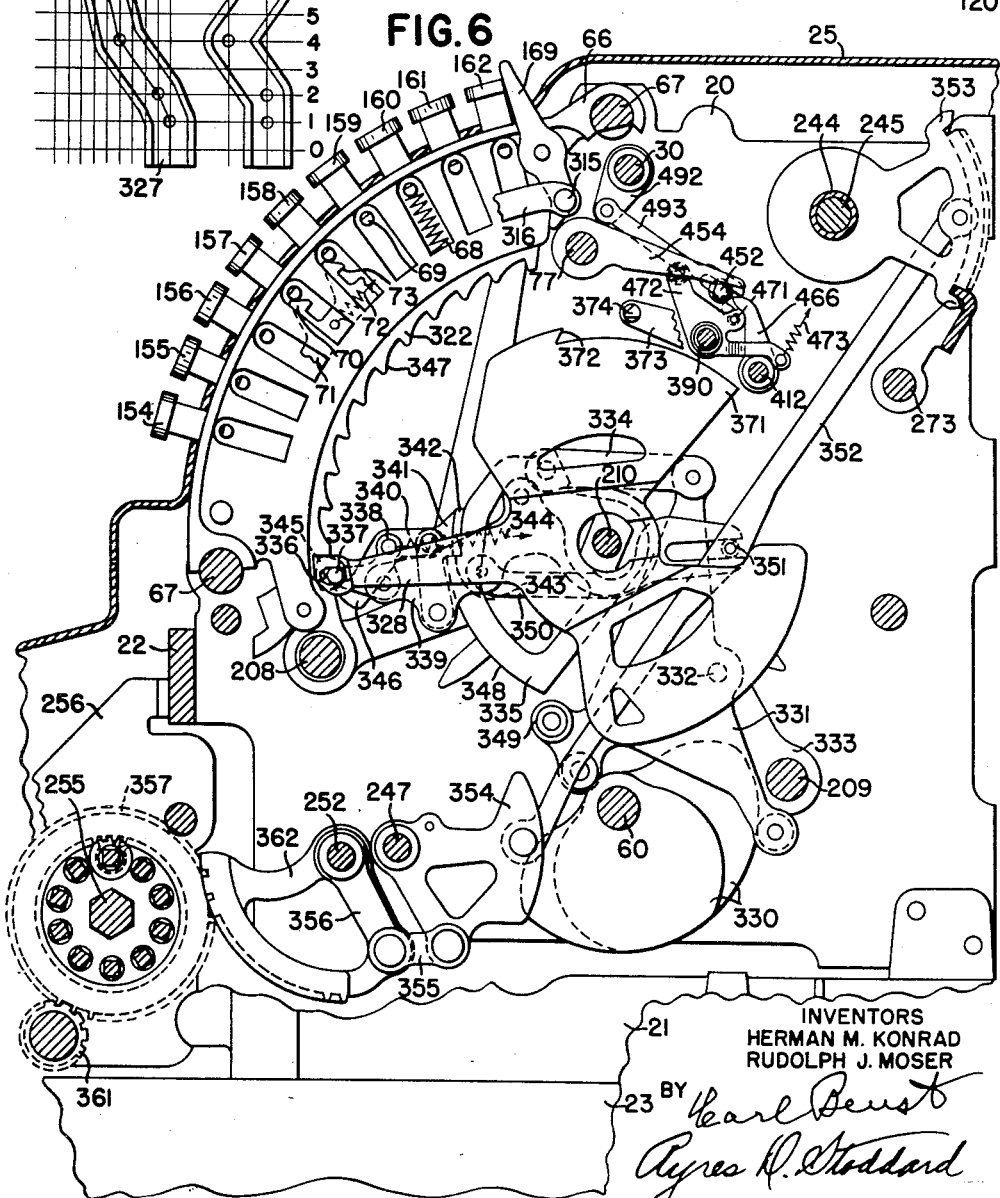
INVENTORS
HERMAN M. KONRAD
RUDOLPH J. MOSER
BY
THEIR ATTORNEYS

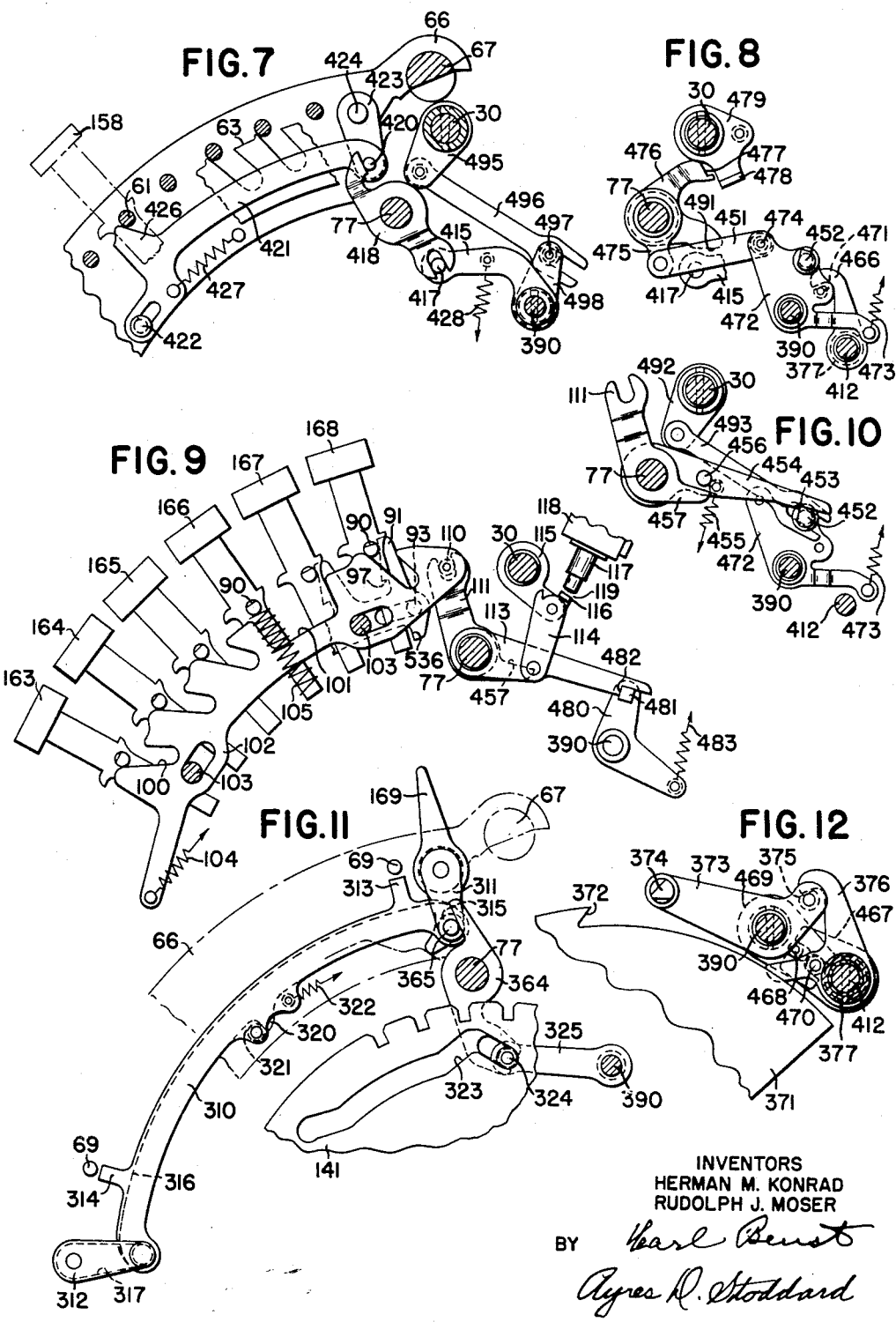

June 3, 1958 H. M. KONRAD ET AL 2,837,275
CONTROL OF TOTALIZER SELECTING MECHANISM BY THE TOTALIZER
Filed Oct. 23, 1953 7 Sheets-Sheet 5
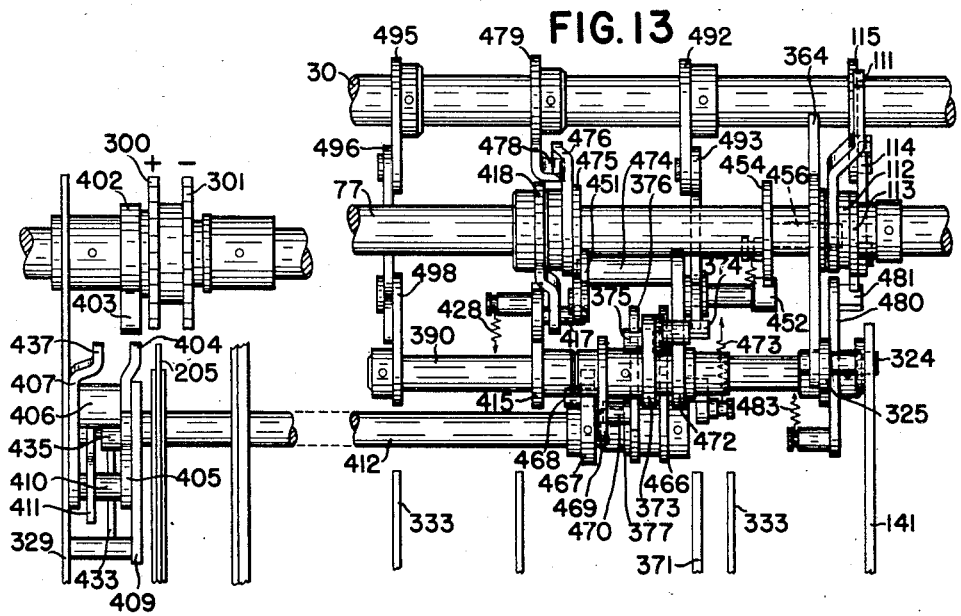
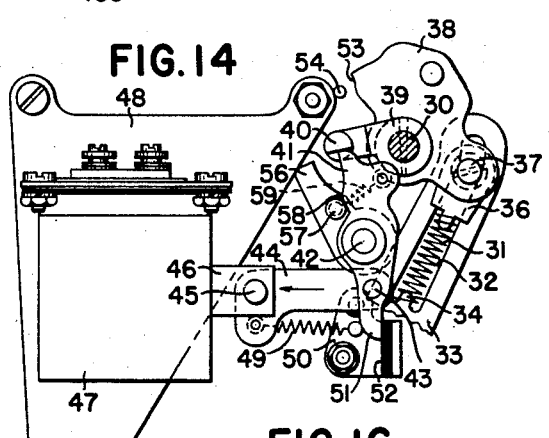
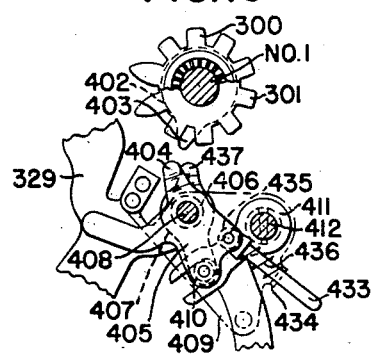
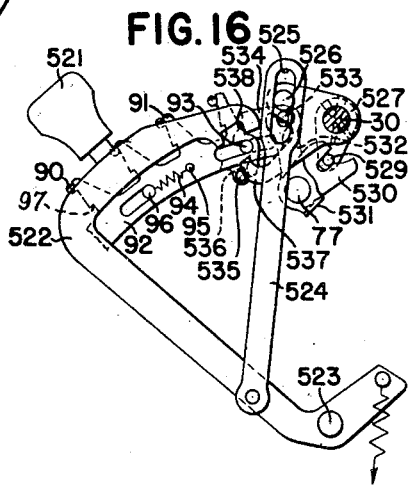
INVENTORS
HERMAN M. KONRAD
RUDOLPH J. MOSER
BY
THEIR ATTORNEYS June 3, 1958  H. M. KONRAD ET AL  2,837,275
CONTROL OF TOTALIZER SELECTING MECHANISM BY THE TOTALIZER
Filed Oct. 23, 1953  7 Sheets-Sheet 6

FIG.17

| CHECK COUNT ON TOTAL | PICKUPS | CHECKS | CHECKS | DEPOSITS | CHECK COUNT | BALANCES |
|---|---|---|---|---|---|---|
| 0 ★ | 500.00 | ★ 50.00 | ★ 50.00 | | | |
| | | ★ 50.00 | ★ 50.00 | | | |
| | | | | ★ 100.00 | 4 ★ | 400.00 ★ |
| 0 ★ | 400.00 | ★ 400.00 | ★ 400.00 | | | |
| | | | | ★ 1.00 | 2 ★ | 399.00 OD★ |
| 0 ★ | 399.00 OD | ★ 50.00 | ★ 50.00 | | | |
| | | ★ 50.00 | | | | |
| | | | | ★ 10.00 | 3 ★ | 539.00 OD★ |
| 0 ★ | 539.00 OD | ★ 5.00 | ★ 5.00 | | | |
| | | | | ★ 1,000.00 | 2 ★ | 451.00 ★ |
| 11 | | ★ 1,160.00 ★ | | | | ★ 851.00 ★ |
| | | | | ★ 1,111.00 ★ | | |
| | | | | | | ★ 938.00 OD★ |
| | | | | | | ★ 0.00 ■ |

FIG.18

| CHECK COUNT ON TOTAL | PICKUPS | CHECKS | CHECKS | DEPOSITS | CHECK COUNT | BALANCES |
|---|---|---|---|---|---|---|
| 0 ★ | 400.00 OD | | | | | |
| 0 ★ | 500.00 | ★ 50.00 | ★ 50.00 | | | |
| | | ★ 50.00 | ★ 50.00 | | | |
| | | | | ★ 100.00 | 4 ★ | 0.00 OD★ |
| 0 ★ | 399.00 | | | | | |
| 0 ★ | 400.00 | ★ 400.00 | ★ 400.00 | | | |
| | | | | ★ 1.00 | 2 ★ | 0.00 OD★ |
| 0 ★ | 539.00 | | | | | |
| 0 ★ | 399.00 OD | ★ 50.00 | ★ 50.00 | | | |
| | | ★ 50.00 | | | | |
| | | | | ★ 10.00 | 3 ★ | 0.00 OD★ |
| 0 ★ | 451.00 OD | | | | | |
| 0 ★ | 539.00 OD | ★ 5.00 | ★ 5.00 | | | |
| | | | | ★ 1,000.00 | 2 ★ | 0.00 OD★ |
| 11 | | ★ 1,160.00 ★ | | | | ★ 0.00 ★ |
| | | | | ★ 1,111.00 ★ | | |
| | | | | | | ★ 0.00 OD★ |
| | | | | | | ★ 0.00 OD■ |

INVENTORS
HERMAN M. KONRAD
RUDOLPH J. MOSER
BY
THEIR ATTORNEYS

June 3, 1958     H. M. KONRAD ET AL     2,837,275

CONTROL OF TOTALIZER SELECTING MECHANISM BY THE TOTALIZER

Filed Oct. 23, 1953     7 Sheets-Sheet 7

FIG. 19

| CHECK COUNT ON TOTAL | PICKUPS | CHECKS | CHECKS | DEPOSITS | CHECK COUNT | BALANCES |
|---|---|---|---|---|---|---|
| 0 ★ | 400.00 OD | | | | | |
| 0 ★ | 500.00 | ★ 50.00 | ★ 50.00 | | | |
| | | ★ 50.00 | ★ 51.00 | | | |
| | | | | ★ 100.00 | 4 ★ | 1.00 OD★ |
| 0 ★ | 399.00 | | | | | |
| 0 ★ | 400.00 | ★ 400.00 | ★ 400.00 | | | |
| | | | | ★ 1.00 | 2 ★ | 0.00 OD★ |
| 0 ★ | 539.00 | | | | | |
| 0 ★ | 399.00 | ★ 50.00 | ★ 50.00 | | | |
| | | ★ 50.00 | | | | |
| | | | | ★ 10.00 | 3 ★ | 0.00 OD★ |
| 0 ★ | 451.00 OD | | | | | |
| 0 ★ | 539.00 OD | ★ 5.00 | ★ 5.00 | | | |
| | | | | ★ 1,001.00 | 2 ★ | 1.00 ★ |
| 11 | | ★ 1,161.00 ★ | | | | 1.00 ★ |
| | | | | ★ 1,112.00 ★ | | |
| | | | | | ★ | 1.00 OD★ |
| | | | | | ★ | 0.00 ■ |

INVENTORS
HERMAN M. KONRAD
RUDOLPH J. MOSER

BY *Earl Beust*
*Ayres Q. Stoddard*

THEIR ATTORNEYS

United States Patent Office 2,837,275
Patented June 3, 1958

2,837,275

CONTROL OF TOTALIZER SELECTING MECHANISM BY THE TOTALIZER

Herman M. Konrad and Rudolph J. Moser, Dayton, Ohio, assignors to The National Cash Register Company, Dayton, Ohio, a corporation of Maryland Application October 23, 1953, Serial No. 387,975

13 Claims. (Cl. 235—60.2)

The present invention relates to accounting machines and similar business machines. In the illustrated form, the invention is embodied in and directed to a machine for registering and recording various types of posting transactions in banks, and also other types of transactions incident to the banking business, and is directed particularly to a machine having automatic overdraft control embodying a novel automatic detection lock, such as that fully illustrated and described in the co-pending application of applicants—namely, Herman M. Konrad and Rudolph J. Moser—Serial No. 333,046, filed January 26, 1953.

The invention is also particularly directed to a machine having mechanism whereby the posting runs of various accounts may be proved by means of what is herein termed a zero proof mechanism, which permits the operator, upon the conclusion of the second bookkeeping run, to pin-point any errors that may have occurred during the first posting operation or during the second posting or proof running of the posting by a second bookkeeper.

This invention is an improvement over the invention shown in the United States Letters Patent to Pascal Spurlino, William M. Carroll, Arthur R. Colley, and Alfred G. Kibler, No. 2,375,594, and also shown in the patent to Pascal Spurlino, Everett H. Placke, Willis E. Eickman, and Arthur G. Kramer, No. 2,373,510.

The present machine is embodied in a machine of the general type disclosed in the following United States patents, to which reference may be had for a complete showing and description of standard mechanisms not fully disclosed herein: United States Patent Nos. 1,619,796; 1,747,397; and 1,761,542, issued, respectively, on March 1, 1927; February 18, 1930; and June 3, 1930, to Bernis M. Shipley; No. 2,175,346, issued on October 10, 1939, to Maximilian M. Goldberg; No. 2,141,332, issued on December 27, 1938, to Charles H. Arnold; and No. 1,693,279, issued on November 27, 1928, to Walter J. Kreider.

The machine embodying the present invention, and as illustrated herein and in the Patent No. 2,373,510, above referred to, is commonly referred to as a "commercial posting" machine or a "bank service" machine, and is used by banks and similar business institutions for the posting of individual checking accounts and other types of posting operations incident to the banking business.

For illustrative purposes, the present invention is embodied in a machine which has electrically-operated means under control of the control keyboard for releasing the machine for operation, as fully illustrated and described in the United States application for Letters Patent filed by Pascal Spurlino, Frank B. Moser, George L. Wheeler, and Leonard Struve on April 12, 1949, Serial No. 87,026, which issued into Letters Patent No. 2,698,715, on January 4, 1955.

Normally, in certain types of banking or commercial posting machines, such as that disclosed in the Spurlino et al. Patent No. 2,373,510, the keys of the total control row and the keys of the transaction rows are what are known in the art as "operating" keys; that is, when those keys are depressed, the machine-releasing mechanism is tripped, and the machine goes through its normal cycle of operation.

In such machines, it was necessary to move mechanism by the depression of the key to actually cause the tripping of the release mechanism. However, with the mechanism shown in the above-mentioned Patent No. 2,698,715 of Spurlino et al. and with that shown in this present application, the tripping of the release mechanism is done electrically. The electrical means is energized by the depression of any one of the so-called operating keys. Consequently there is a considerably smaller amount of mechanism to be actually operated by the depression of a key, thus making the key action much easier.

All of the details of the mechanism, of course, are fully illustrated and described in the above-mentioned Patent No. 2,698,715.

It is common practice in the banking business to post each individual checking account daily, provided that such individual accounts remain active every day, and this posting includes the picking up of the old balance; the subtraction of debits, generally in the nature of checks drawn against the account, from the old balance; the addition of credits, generally in the nature of deposits to said account; and the performing of a total-taking operation to arrive at a new balance.

When accounts are posted, they are printed on a combined statement and ledger card, which may be separated down through the center, the statement being mailed or given to the customer, and the ledger card being retained by the bank in its file.

All of these types of records are also adapted to be printed on a journal sheet, which may be termed a detail strip or a recod sheet.

This record sheet is printed near the right side of the machine, and it is printed during all of the operations; that is, each entry, including the picking up of the old balance, the subtraction of checks, the addition of deposits, and the printing of the new balance—all of those figures and items—is printed upon this record sheet.

During proof runs, the postings of the accounts are duplicated by a second bookkeeper, in order to check or zero-proof the posting of the accounts. If the accounts have been properly posted and no errors have been made, the crossfooter will print zeros. However, if an error has been made, the amount of the error will be shown in the right-hand column upon the taking of the new balance, which would, if the posting has been correct, show zero; however, if an error has been made, the amount of that error, as above mentioned, will be printed in the right-hand column of the record sheet.

Under the present plan, one bookkeeper, as above mentioned, posts the checks and deposits to the statements in the conventional manner.

Upon the conclusion of the posting runs, a second bookkeeper, by reference to the checks and deposits, relocates the active accounts. The new, or last, balance is entered with the opposite prefix; that is, if said balance is an overdraft, it is entered through the balance pick-up key, and, if said new balance is a positive amount, it is entered through the overdraft pick-up key. The checks and deposits are then entered through their respective keys, and the balance is extended through the new balance key. The account is offset in the tray for ease in checking, in case of error. If any errors have been made by either one of the bookkeepers, the amounts of the errors, plus or minus, are printed in the last, or right-hand, column of the journal and are accumulated in the "new balance" total or the "overdraft" total.

Now, when the proof run is completed, the machine is cleared. The total of the checks and deposits is proved to the posting run. The "new balance" total and the "overdraft" total should indicate zero. Any amount other than a zero is a signal of an error made by one of the two bookkeepers. An examination of the right-hand column of the record sheet will pin-point the error.

Before any of the errors are corrected, the totals from the posting run are picked up in their respective keys; that is, they are picked up on totalizers under control of their respective types of keys.

The errors are then corrected, and the machine is cleared. In this way, the final totals on the actual machine run would be machine-printed totals, which would indicate that any errors made have been corrected. The individual accounts which have been corrected are again proved by the same method.

With the method used in conjunction with the machine described herein, the following things have been proved: (1) old balances have been picked up correctly; (2) checks have been posted for the correct amounts; (3) deposits have been posted for the correct amounts; (4) new balances have been extended correctly; (5) no high posting exists; (6) all accounts are posted correctly; and (7) all errors have been properly corrected.

It is, therefore, an object of the present invention to provide machines which are used in bank establishments for the purpose of posting daily accounts of their customers with an automatic overdraft control, and to so control that overdraft control that by means of a double run of posting—that is, one run by one operator and the second run by a second operator—any errors which have been made will show up in the printing of the totals in the right-hand column on the record sheet, thus pin-pointing to the operators exactly where the error occurred.

Another object of this invention is to provide a machine with a locked credit balance or overdraft and in the same machine provide means to automatically select the plus side or the minus side of the crossfooter or balance totalizer.

A further object of the present invention is the provision of means to effect said automatic selection of the plus side or the minus side of the balance totalizer by the condition of the totalizer itself.

It is another object of the present invention to so control the automatic overdraft detection lock that it is ineffective during the proving posting runs.

With these and incidental objects in view, the invention includes certain novel features of construction and combinations of parts, a preferred form or embodiment of which is hereinafter described with reference to the drawings which accompany and form a part of this specification.

In said drawings:

Fig. 1 is a diagrammatic view of the keyboard of the machine in which the present invention is shown.

Fig. 2 is a diagrammatic view of the indicator, showing the date, the number of checks, and the amounts and types of transactions.

Fig. 3 is a sectional view through the machine, taken to the right of one of the amount banks, looking toward the left of the machine, and showing the differential mechanism associated therewith and the drive from the main drive to the printer drive shaft.

Fig. 4 is a diagrammatic view of the totalizers and the totalizer-selecting cams.

Fig. 5 is a wiring diagram showing the circuits through the electrical means which operates the machine release tripping mechanism, and through the switches which are operated by the keys.

Fig. 6 is a sectional view through the machine, taken to the right of the first transaction bank, looking toward the left of the machine and showing the differential mechanism associated with said first transaction bank.

Fig. 7 shows a portion of the overdraft key control of the machine release locking mechanism.

Fig. 8 shows a part of the overdraft controlling mechanism to prevent release of the machine when the crossfooter in the upper totalizer line is in an overdrawn condition.

Fig. 9 shows a part of the overdraft control means to prevent release of the machine by the total keys associated with the crossfooter on the upper totalizer line, when the crossfooter is in an overdrawn or minus condition; and also shows a part of the solenoid trip for the machine release mechanism.

Fig. 10 shows still another part of the overdraft control means to prevent release of the machine when the crossfooter on the upper totalizer line is in a minus or overdrawn condition, and also shows the means to restore the overdraft control to normal position.

Fig. 11 shows the manually-operable control lever to prevent operation of the balance pick-up key in position 9 of the control row, and of the overdraft pick-up key in position 1 of the control row, when said lever is in its forward position, as shown here.

Fig. 12 shows the overdraft latch which controls the release of the machine and also shows part of the means to control automatic positioning of the differential of the control row when the crossfooter of the upper line is in a minus condition.

Fig. 13 is a fragmentary front view showing a portion of the overdraft mechanism and its control over the machine-releasing mechanism.

Fig. 14 shows a portion of the machine-releasing mechanism, the tripping mechanism for said machine-releasing mechanism, and the electrical means which operates said tripping mechanism.

Fig. 15 is a detail of the overdraft mechanism for the crossfooter on the upper totalizer line.

Fig. 16 is a detail of the key release lever, by means of which any amount keys erroneously depressed may be released, in the usual and well-known manner, and by means of which any key in the total row may be released when the machine contains an overdraft and will not be released for operation when, for example, the new balance key is depressed.

Fig. 17 is a facsimile of a portion of a record sheet printed during a regular posting run of several accounts.

Fig. 18 is a facsimile of a portion of a record sheet printed during proof runs of the posting of the accounts, shown in Fig. 17, which posting runs were made by a second bookkeeper, and which posting proof shows that there was no error in the original postings nor in the proof runs.

Fig. 19 is a facsimile of a portion of a record sheet printed during proof runs of the postings of the accounts previously shown as posted in Fig. 17, said proof runs having been made by a second bookkeeper, and showing that there was an error made in two of the proof runs made by the second bookkeeper.

GENERAL DESCRIPTION

The machine embodying the present invention is of the general type disclosed in the Spurlino, Placke, Eickman, and Kramer Patent No. 2,373,510, previously mentioned.

The machine is provided with a column-printing mechanism, located at the front of the machine, for simultaneously recording identical data in one or more columns of insertable combined statement and ledger sheets during one operating cycle of the printing mechanism. In this same machine there is provided means for printing a record sheet which embodies all of the items and balances which are printed on the statement sheet.

Machines of this character are particularly useful in the preparation of statements and ledger cards used in banks, particularly because such statements and ledger cards are provided with a plurality of columns for the printing of data in the several columns.

In this present case also, the specific example chosen shows normal posting runs, by the regular posting operator, of several accounts, and then proof posting runs, by a second bookkeeper, of the same several accounts, in order to prove whether or not the posting runs were made correctly or whether or not the proof runs were made correctly.

As above mentioned, when all of the new balance totalizers and the overdraft totalizers indicate zero, they indicate that no error has been made, either by the original posting operator or by the bookkeeper who made the proof run.

The main portion of the machine embodying this invention is of the standard construction well known in the art, and, as the standard mechanism is fully disclosed in the patents referred to at the beginning of this specification, such mechanism will be but briefly treated herein.

The machine chosen to illustrate the present invention has a plurality of rows of amount keys for entering items into the various totalizers with which the machine is equipped, and for setting up the corresponding type wheels to record the amounts on record material.

The machine also has a row of transaction keys for use in entering positive and negative items into the various totalizers, and a row of symbol-printing keys for controlling the printing of symbols for identifying the various items. Instead of the conventional total lever illustrated in some of the earlier patents mentioned above, this machine is equipped with a row of total keys, which control certain elements of the machine for reading and resetting operations.

Certain of the keys in the control row and the keys in the transaction row of the machine illustrated in Patent No. 2,373,510 are what are known in the art as "operating" keys; that is, when those keys are depressed, the machine-releasing mechanism is tripped, and the machine goes through its normal cycle of operation.

In such machines, it was necessary to move mechanism by the depression of the key, to actually cause the tripping of the machine release mechanism.

In this present invention—that is, in the machine in which the present invention is embodied—this tripping of the machine release mechanism is accomplished by electrical means. The electrical means is energized by the depression of any one of the so-called "operating" keys. Consequently, there is considerably less mechanism to be actually operated by the depression of a key, and thus the key action is much easier.

In such types of key-releasing mechanism, it becomes necessary to make certain that the key which is operated is retained in its depressed position prior to the energization of the electrical means which operates the machine release tripping mechanism.

There is associated with the row of transaction keys and also with the row of total keys a micro-switch which is operated upon depression of any one of the keys of the transaction bank, and upon operation of certain keys of the total bank.

The depression of these keys completes the circuit through the same electrical device which operates the tripping means for the machine-releasing mechanism.

The machine illustrated herein is also provided with two totalizer lines; namely, an upper or No. 1 totalizer line, and a back or No. 2 totalizer line. The upper or No. 1 totalizer line supports the balance totalizer, which is often referred to as a crossfooter and which is used for computing positive and negative amounts to arrive at new balances.

The back or No. 2 totalizer line has thereon four totalizers, two of which are add-subtract totalizers or croosfooters, one being used for keeping a total of the debit or check items, and the other for keeping a total of the credit or deposit items. The reason add-subtract totalizers or crossfooters are used for totals of checks and deposits is that in the deposit correction operations it is necessary to make a subtract operation in order to secure a correct total in the case of an error, and in check correction operations it is necessary to make an add operation to correct the error.

Therefore, in connection with zero proof runs, which are made here on the machine embodying the present invention, it becomes an absolute necessity to include a totalizer line of the type mentioned above, because when an error is found it must be corrected, whether the error is in the deposit column or in the check columns.

In the present invention there is provided, as indicated in Fig. 1 of the drawings, a manually-operated lock, which, after the overdraft key is depressed, is moved into the dot-and-dash position to hold or retain the overdraft key in its depressed position, thus rendering the overdraft lock inoperative during proof runs.

As above mentioned, Fig. 17 shows the normal posting record of several accounts on the record sheet or detail strip, and Fig. 18 shows proof runs of the same accounts where no errors have been made either by the one that posted the accounts or by the one that ran the proofs. Fig. 19 shows the result of proof runs wherein errors were made in the check and deposit columns by the operator or bookkeeper that made the proof runs of these accounts.

In the illustrated form there are seven columns of printing, which have been indicated as follows: On the left is the check count on total; then comes the pick-up column—that is, the amounts which are picked up from the last new balance, which on the pick-up becomes the old balance—then there are two columns for listing checks; then one column for listing deposits; then an automatic check column; and finally the balance column. In the proof run by the second bookkeeper, the principle of running this proof is to reverse the last balance on the customer's account, which is a new balance, and, if the new balance is in the positive form, it will be picked up and entered into the machine on the negative side by the use of the overdraft pick-up key, along with the amount keys. If the new balance happens to be an overdraft, then it is picked up in the proof run by the use of the balance pick-up key in row 2, which puts it on the plus side of the totalizer. After the new balance has been picked up, then the former pick-up of the old balance is remade; that is, the old balance is picked up again, with the balance pick-up key being used to initiate operation of the machine. In other words, if a plus, it was put on the plus side, and if a minus, it was picked up in the minus side, with the overdraft pick-up key.

After the new balance has been reversely picked up and the old balance has been picked up and entered into the plus and minus sides of the totalizers, as the case may be, then the proof bookkeeper re-enters or re-posts all of the checks and all of the deposits and then strikes the balance, and, if the balance shows zero, it indicates that no error has been made either by the original posting operator or by the proof operator or bookkeeper.

Figs. 17 and 18 indicate all of such types of operations by the normal posting operator and by the proof operator, and, since all of the balances in the right-hand column in Fig. 18 show zeros, it indicates that the proof runs of these particular accounts and the original posting of the accounts were both made correctly by the original bookkeeper and by the proof bookkeeper who re-posted all items from the same checks and deposit slips.

However, in Fig. 19 is shown a facsimile of a record sheet wherein the proof run operator, using the same items of the same accounts of Fig. 17 which were originally posted, has proved that an error was made in the entry of one of the checks in the proof run. Therefore the first balance taken shows a one-dollar overdraft, which indicates to the operator that an error has been made either by the proof operator or by the posting operator, and this can be pin-pointed by following down the right-hand, or balance, column and can be easily located. In this Fig. 19 have been shown two instances where the proof run operator made errors; the first one, as above mentioned, consisted of the entry of a $51.00 check instead of a $50.00 check, and in the second instance a $1001.00 deposit was entered instead of a $1000.00 deposit, which thus proved that a second error had been made.

In taking the totals, the total of $1161.00 shows the total amount of the checks that were posted by the proof operator, and $1112.00 shows the total of deposits which were posted by the proof operator. These, both being one dollar off, show the operator quickly where the error was made. In other words, the first error was made by the proof operator in the posting of the fourth $50.00 check, which was posted by said proof operator as $51.00, and the second error was made by the proof operator in the posting of the $1000.00 deposit, which was erroneously posted as $1001.00.

Therefore, it can be seen, from what has been said above and in viewing the facsimiles in Figs. 17, 18, and 19, that it becomes quite easy to pin-point the errors by checking down or examining the balance column on the right-hand side of the record sheet.

After the proof runs have been made, the operator moves the manually-operable lock for the overdraft key back into the full-line position, whereupon the overdraft key may be released, so that the automatic overdraft lock will again become operative and function as intended for the normal posting operation.

DETAILED DESCRIPTION

The framework of the machine is substantially like that shown in the above-mentioned Spurlino, Placke, Eickman, and Kramer Patent No. 2,373,510, and, therefore, only a very brief description of the framework will be given herein, as only part of it is shown in this application. The machine side frames 20 (Figs. 3 and 6) (only one of which is shown) are mounted on a base 21 and are tied together at the front by a bar 22 and at the rear by a bar, not shown. The side frames 20 and the base 21 are mounted on printer frames 23 (only one of which is shown), which are tied together near their front by a tie bar 24 (Fig. 3).

The machine proper and the printing mechanism are enclosed in a suitable cabinet 25 (Figs. 3 and 6) having the necessary hinged sections for access to certain parts of the machine by the operator whenever necessary.

Normally the machine is electrically operated by a conventional type of motor, such as that disclosed in the Shipley patents referred to hereinbefore, and, in addition, a hand crank is provided for operating the machine manually when necessary.

Machine release mechanism

Fig. 14 shows the machine release mehcanism, including the usual release shaft 30, a part of the mechanism for rocking it counter-clockwise to release the machine, the machine release shaft tripping mechanism, and the electrical device which operates said machine release shaft tripping mechanism.

The means for restoring the shaft 30 to its normal position is not shown herein, but it is identical with that which is fully illustrated and described in the above-mentioned Shipley Patent No. 1,619,796, and, if a description thereof is desired, reference may be had to that patent for the same.

The release shaft 30 (Fig. 14) is adapted to be moved counter-clockwise by a strong spring 31, mounted in a slot 32 of a link 33, in exactly the same manner as fully illustrated and described in the above-mentioned Shipley Patent No. 1,619,796. The spring 31 sits on a finger 34 of the link 33 and also engages fingers 35 of arms 36 (only one arm being shown), which are mounted on each side of the link 33. A stud 37, carried by the arms 36, projects into an arm 38, which is secured to the machine release shaft 30. Also secured to this shaft 30 is an arm 39, carrying a flat-sided pin 40.

The shaft 30 is held in its normal position by the upper end of a trip lever 41, engaged by the flattened pin 40 and held in such engagement by the spring 31. This trip lever 41 is pivoted on a stud 42, carried by the machine side frame 20.

The trip lever 41 carries a stud 43, by means of which said trip lever is connected to a link 44, which in turn is connected by means of a long stud 45 to a solenoid core 46 of a solenoid 47, mounted on a bracket 48, secured to the side frame 20. A spring 49, connected to the link 44 and to a bracket 50, secured to the machine side frame, normally maintains the parts in the positions shown in Fig. 14, where the upper end of the trip lever 41 is beneath the flat stud 40 of the arm 39, which is secured to the machine release shaft 30. A finger 51 on the lower end of the trip lever 41 is normally held by the spring 49 in contact with a resilient sound-deadening block 52, of rubber or similar material, secured to the bracket 50.

By means to be described hereinafter, the solenoid core 46 is moved to the left, as viewed in Fig. 14, in the direction of the arrow, thus pulling the link 44 in the same direction, which rocks the trip lever 41 clockwise, moving its upper end from beneath the flattened pin 40, whereupon the strong spring 31, through the medium of the stud 37 and the arm 38, rocks the machine release shaft 30 clockwise until a surface 53 of the arm 38 contacts a limiting pin 54, carried by the side frame 20.

Such movement of the machine release shaft 30, as has been clearly illustrated and described in the above-mentioned Shipley Patent No. 1,619,796, closes a circuit through the machine motor, thus driving the machine through a normal cycle of operation.

The solenoid is energized upon the closing of certain micro-switches, which will be described hereinafter in connection with a particular part of the control of the operation of the release of the machine by certain control keys.

In order to prevent an operator from accidentally or intentionally holding down any one of the operating keys—that is, keys which when depressed cause the machine to be released and to be driven through an operation of the machine, thus causing an immediate second operation of the machine—there is provided a usual non-repeat pawl 56 (Fig. 14), pivoted on the stud 42 and having a stud 57, held in contact with a surface 58 of the trip lever 41 by a spring 59.

The pawl 56 is slightly higher than the upper end of the trip lever 41, and consequently, when the pin 40 is released by the lever 41 and moved downwardly under the tension of the spring 31, it is moved downwardly to the left of the trip lever 41 and to the right of the non-repeat pawl 56, thus holding the lever 41 in its released position at the end of the operation of the machine, until after the arm 39 is restored clockwise to a position slightly above that shown and then finally restored to the position shown in Fig. 14.

At this time, the arm 39 is slightly above the position shown, and the circuit through the solenoid 47 is broken; consequently, the spring 49 can restore the solenoid core 46 and the link 44 to the right, to the position shown, thus moving the trip lever 41 to the position shown, so that, when the arm 39 finally assumes the position shown, the flattened pin 40 will be directly above the upper end of the trip lever 41.

Keyboard

The keyboard of the machine is diagrammatically shown in Fig. 1, and, since this keyboard has been substantially fully described in detail in the above-mentioned Spurlino et al. Patent No. 2,373,510, it will be only briefly described herein.

The four left-hand banks of keys 151 are used for setting up the number of checks in any given bundle of checks.

The next ten rows of amount keys 152 are used for settting up amounts, pick-ups of balances, the amounts of checks and deposits, and any other desired information used in connection with the banking business.

The keys 153 in the next, or symbol, row, are used as print keys only, to control the setting of symbols to be printed on the combined statement and ledger sheet and also on the record sheet when posting.

The keys 154 to 162 inclusive, of row 1, will now be described.

The overdraft pick-up key 154 is used when the account balance to be picked up is an overdraft or debit balance. It is also used during the proof run to pick up the last positive new balance of the customer, because in the proof run, as has been previously mentioned herein, when the balance is in a positive form, or, in other words, when it is a plus balance for the proof run, it is picked up reversely—that is, as a negative balance or overdraft—and, in order to do this, it is necessary to use the overdraft pick-up key 154. Amounts entered through this key will add on the subtract side of the crossfooter or totalizer on the upper totalizer line.

The deposit correction key 155 is used to correct any deposit which might have been entered incorrectly.

The analysis key 156 is used when it is desired to indicate any information in connection with a deposit which contains checks which are to be collected from other banks.

The deposit key 157 is used when deposits or credits are posted to any and all accounts. Amounts entered through this key will add into the plus side of the totalizer on the upper line and will also add into the plus side of the deposit crossfooter, which is on the back totalizer line.

The overdraft key 158 is used to unlock the overdraft lock or, in other words, to set up a condition whereby the machine may be released when there is an overdraft in the balance totalizer or crossfooter, in which event the new balance key is locked against operation, and it becomes necessary to depress the overdraft key 158 and then the new balance key in the total row to release the machine. This key 158 may also be depressed in conjunction with the indicator balance key when there is an overdraft in the machine, in order to indicate how much that overdraft is. This key 158 is also depressed and locked in its depressed position by a manually-operable locking device, as has been mentioned above, prior to the beginning of the proof run of the bank's customers.

As will be described in detail hereinafter, the depression of the overdraft key 158 is used to prevent the actual locking of the machine when an overdraft has occurred, as just above mentioned.

It can be clearly seen, therefore, that in a proof run it is necessary to render the overdraft lock ineffective, and therefore, in order to do so, the overdraft key 158 is, as above mentioned, locked in its depressed position, prior to the beginning of the proof runs, by a manually-operable lever 170 (Fig. 1), which is pivoted to the machine cabinet by a screw stud 171.

The check key 159 is used to post all checks or debits to any and all accounts during posting runs. Amounts posted through this key are automatically subtracted from the crossfooter on the upper, or No. 1, line, because the minus side of this crossfooter is selected by this check key. Amounts posted through this check key 159 are added into the plus side of the check totalizer, a crossfooter located on the back, or No. 2, line, since said plus side of the check totalizer is selected to have added thereinto the amounts of the checks as they are listed.

The space key 160 is used to space the combined statement and ledger for any purpose other than the regular posting operation.

The check correction key 161 is used to correct or take out a check which has been posted incorrectly or posted to the wrong account. Amounts added or entered through this key will be added into the balance totalizer on the No. 1 line and will be subtracted from the check add-subtract totalizer on the No. 2 line.

The balance pick-up key 162 is, in the normal operations of the machine, used to pick up the old balance from the combined statement and ledger sheet prior to posting operations, and this key, when so used, selects the plus side of the balance totalizer, so that, as the posting continues by the entry of checks and deposits, a final new balance may be taken from this upper crossfooter on line No. 1.

This balance pick-up key 162 is also used to enter a negative new balance of a customer's account when a proof posting run is to be made of that customer's account. This is in accordance with the system mentioned at the beginning, wherein the new balances are always entered in the machine, on the proof run, in the reverse from which they are shown indicated on the right-hand or balance column of the record sheet as shown in Fig. 17.

The keys 163 to 168 inclusive of the total row are used for total operations or sub-total operations.

The new balance key 163 is used to extend the new balance after all items have been posted. However, if this new balance should be an overdraft, the machine will not be released when the new balance key is depressed until the overdraft key has been first depressed.

The sub-balance key 164 is used to print the balance without clearing it from the crossfooter.

The indicate balance key 165 is used to set the indicator of Fig. 2 to indicate the balance standing on the crossfooter after items have been posted.

The sub-total row No. 1 key 166 is used with the overdraft pick-up key 154, the deposit key 157, the check key 159, and the balance pick-up key 162 to read or take a sub-total of the accumulations which are on the corresponding totalizers on the back, or No. 2, totalizer line.

The clear row 1 key 167 is used in combination with the keys in row 1 to take totals from their respective totalizers.

Below the keys 163 to 168 of the total row is the word "add" surrounded by a dotted circle. This represents the zero position of the total row, and the differential mechanism associated with these keys will stop in this position on all add operations. This is fully shown and described in the above-mentioned Goldberg Patent No. 2,175,346.

*Transaction key bank*

The transaction key bank is shown in Fig. 6 and partly in Fig. 7 and Fig. 11, looking from the right side of the machine.

Each key of this bank carries a pin 61 (shown in section in Fig. 7), each pin except the one on the overdraft key 158 is adapted to cooperate with a releasing bar 63 of the usual type, which is slidably mounted on the usual key frame 66, which in turn is mounted on the usual rods 67, supported by the machine side frames 20. The releasing bar 63 is cut away opposite the pin 61 of the key 158 and therefore the depression of this key 158 has no effect on said releasing bar 63.

The usual coil springs 68 (only one of which is shown in Fig. 6) hold the keys in their normal, undepressed, positions, in a manner which is well known in the art.

Each of the transaction keys carries on its opposite side —that is, on the side opposite the pin 61—a flattened pin 69 (Fig. 6), which cooperates with an angular nose 70 of a retaining detent 71 of the usual type, which is mounted on the key frame 66 in the usual manner, as shown in the previously-mentioned patent of Spurlino et al., No. 2,698,715, and also in the Shipley Patent No.

1,682,197. A spring 72 normally retains the angular sides of the noses 70 against the pins 69.

When one of the keys is moved into its depressed position, the pin 69 moves the detent 71 downwardly until the pin passes a shoulder 73 on the bottom of the nose 70, whereupon the spring 72 immediately moves the detent 71 upwardly again, thus latching the key in its depressed position in the usual manner.

When any one of the transaction keys, except the overdraft key, is moved into its depressed position and latched in that position, it causes operation of a microswitch 85 (shown in diagrammatic form in Fig. 5) in a manner which is fully illustrated and described in the above-mentioned Konrad and Moser application Serial No. 333,046, filed January 26, 1953.

When this switch 85 is closed, it completes the circuit through a solenoid which has for its purpose the function of operating the machine release tripping mechanism, which has been described previously, so that, just as soon as one of the transaction keys, except the overdraft key, is completely depressed, the machine-releasing mechanism is released and can function to cause the machine to go through the normal cycle of operation. The solenoid referred to is the solenoid 47, previously described, and the circuit just mentioned through the switch 85 will be described hereinafter.

Total control bank

The total control bank and its associated mechanism and the connections whereby it controls or operates a micro-switch to in turn control the solenoid release of the machine release shaft will now be described.

As previously stated, there are in this control bank six control keys, 163 to 168 inclusive (Figs. 1 and 9), which are slidably mounted in a key frame, which is not shown but which is similar to the key frame 66 for the transaction bank of keys and is mounted on the previously-described rods 67. Each of the keys has a flattened pin 90 (Fig. 16) cooperating with the angular face of a nose 91 on a retaining detent 92 slidably mounted on pins 93 (only one of which is shown) carried by the total key frame (not shown). The angular faces of the noses 91 are normally held in contact with the pins 90 by a spring 94, connected to a pin 95 on the detent 92 and a pin 96 in the key frame (not shown).

When any one of the keys 163 to 168 is depressed, its pin 90 moves the detent 92 upwardly, as viewed in Fig. 16, until the flattened portion of the pin is below a surface 97 of the nose 91, whereupon the spring 94 again moves the detent 92 back to the position shown in Fig. 16, thus retaining the depressed key in the depressed position.

The pins 90 of the keys 163, 164, 165, and 168 cooperate with angular slots 100 (Fig. 9), and the pins 90 of the keys 166 and 167 cooperate with a straight-sided slot 101 of an operating bar 102 slidably mounted on pins 103 supported by the key frame (not shown). A spring 104 normally holds the left sides of the slots 100 against the pins 94 of the keys 163, 164, 165, and 168. All of the keys 163 to 168 inclusive are maintained in their normal positions by compression springs 105, one of which is shown associated with one key. These springs function in the normal way, which is well known in the art.

The operating bar 102 carries a pin 110 (Fig. 9), engaged by a forked arm 111, pivoted on a rod 77, carried by the machine side frame 20. Connected to the arm 111 by means of a hub 112 (Fig. 13) is an arm 113, which is connected by a link 114 to an arm 115, pivoted on the machine release shaft 30. The arm 115 has a formed-over lip 116, adapted to cooperate with a plunger 117, which operates contacts of a micro-switch 118 in a manner to be described hereinafter.

When any one of the keys 163, 164, 165, or 168 is depressed, its downward movement causes its pin 90 to move the control bar 102 downwardly, thus rocking the arm 111 and the arm 113 counter-clockwise, whereupon the link 114 rocks the arm 115 counter-clockwise and causes the lip 116 to engage the plunger 117 and move it upwardly to close the contacts of the micro-switch 118, the purpose of which will be described hereinafter.

Whenever one of the keys 166 or 167 is depressed, the depression of either of these keys does not move the bar 102, due to the fact that the pins 90 of these keys cooperate with the straight-sided slot 101, and, consequently, the micro-switch plunger 117 is not operated.

This micro-switch is in circuit with an electrical device, to be described later, which is for the purpose of operating the machine release shaft tripping mechanism.

The clearance 119 (Fig. 9) between the lip 116 and the end of the plunger 117 is sufficient to permit the depressed key 163 to 165 and 168 to have a stud 90 below the shoulder 97 on the nose 91 of the retaining detent 92, so that the key will be positively locked in its depressed position before the plunger 117 is moved inwardly a distance sufficient to close the contacts of the microswitch 118.

Circuits

The circuits for energizing the solenoid 47 under the control of the keys 154 to 162 inclusive and 163, 164, 165, and 168 are shown in Fig. 5.

When any one of the keys 154 to 162 inclusive is depressed and latched in its depressed position, in the manner described above, it causes operation of the micro-switch 85, thus completing a circuit as follows:

From one side 120 of the source of supply through line 121, line 122, closed micro-switch 85, line 123 to line 124 through the solenoid 47, line 125 to the opposite side of the line at point 126, thus energizing the solenoid 47, whereupon the core 46 is moved to the left, as viewed in Fig. 14, for the purposes described above.

When any one of the keys 163, 164, 165, or 168 is depressed, it, in the manner described above, operates the plunger 117 (Figs. 5 and 9) to close the circuit in the micro-switch 118, thus completing a circuit as follows:

From the point 120 of the supply, through line 121, line 127, closed micro-switch 118, line 128, thence through line 124, through the solenoid 47, through line 125, to the point 126 on the opposite side of the line, thus energizing the solenoid 47, whereupon the core 46 is moved to the left, as viewed in Fig. 14, to cause the tripping of the machine release shaft 30 in the manner described previously.

Amount banks and amount differentials

The tens banks of amount keys and their associated differential mechanisms are alike in every respect and are similar in construction to those shown in the patents to Shipley and Goldberg hereinbefore referred to. Since all amount banks are alike, a description of one of the amount banks and the differential associated therewith will be sufficient.

The amount keys 152 are mounted in a key frame 200 (Fig. 3) supported by the rods 67, extending between the machine side frames 20. The depression of any one of the amount keys 152 rocks a zero stop pawl 203, associated with that particular denomination, counter-clockwise out of the path of a reset spider 204 free on a hub of an amount differential actuator 205, rotatably supported on a bushing 206, extending between two similar support plates 207 (only one of which is shown). These plates 207 in turn are supported by rods 208 and 209, extending between and supported by the side frames 20. There is a pair of supporting plates 207 for each amount differential, and a tie rod 201 extends through holes in the center of the bushings 206 to secure all of the amount differentials in a compact unit.

A notch in the forward end of the spider 204 engages a stud 211 in the forward end of a bell crank 212, pivoted on an extension of the actuator 205. Carried by the vertical arm of the bell crank 212 is a stud 213, on which is pivoted an arm 214. This arm 214 is also pivoted on the upper end of a latch 215, pivotally mounted on the actuator 205. The latch 215 has a foot 216, normally held in contact with the periphery of a driving segment 217, just above a shoulder 218 thereon, by a spring 219. The driving segment 217 is rotatably supported on the hub of the actuator 205. A link 220 pivotally connects the driving segment 217 to a cam lever 221 pivoted on a stud 222 in the left-hand one of the plates 207, said lever 221 carrying rollers 223 and 224, which coact with the peripheries of cams 225 and 226, respectively, secured on the main drive shaft 60. A depression of any one of the amount keys 152 moves its lower end into the path of a rounded surface 227 of an extension of the forward arm of the bell crank 212.

In adding operations, the main shaft 60 and the cams 225 and 226 make one clockwise revolution, causing the lever 221 to rock the driving segment 217 first clockwise and then counterclockwise back to normal position. Clockwise movement of the segment 217 causes the shoulder thereon, in cooperation with the foot 216 of the latch 215, to carry the latter and the amount actuator 205 clockwise in unison, until the rounded surface 227 contacts the stem of the depressed amount key 152. This rocks the bell crank 212 and, through the arm 214, the latch 215 counterclockwise to disengage the foot 216 of the latch from the shoulder 218 to arrest the clockwise movement of the actuator 205, and to position said actuator according to the value of the depressed amount key 152. Disengagement of the latch 215 from the segment 217 moves a rounded extension 233 of the arm 214 into engagement with the corresponding one of the series of locating notches 234 in a plate 235, secured between the rod 208 and an upward extension of the left-hand support plate 207.

After the latch 215 is thus disengaged from the shoulder 218, an arcuate surface 236 on the segment 217 moves opposite the foot 216 to retain the latch in its set position.

When the lever 221 reaches the terminus of its clockwise movement, a roller 237, carried thereby, coacts with an arcuate surface 238 on a beam 239, pivoted on a stud 240 in the actuator 205, and forces a concave surface of the upper edge of said beam into contact with the hub of the actuator 205 to move the rear end of said beam into a position commensurate with the value of the depressed amount key.

The rear end of the beam 239 engages a stud 241 in a link 242, the upper end of which is pivoted to a segment 243 mounted in one of a series of nested tubes 244, supported by a shaft 245 journaled in the main side frames 20. The lower end of the link 242 is pivotally connected to a segmental arm 246 free on a shaft 247 journaled in the side frames 20. The arm 246 carries a stud 248, which engages a camming slot in a zero elimination cam plate 249, pivotally mounted on a stud 250 in a segmental gear 251 free on a shaft 252, journaled in the side frames 20.

The teeth of the segmental gear 251 mesh with external teeth of an external-internal ring gear 253 having internal teeth which, in cooperation with the periphery of a disc 254, fixed on a shaft 255, form a rotatable support for said gear 253. The shaft 255 is supported by brackets 256, secured to the cross bar 22 and the main framework of the machine. The internal teeth of the ring gear 253 mesh with a pinion 258, rotatably supported in a boring in the disc 254. The pinions 258 and the square shaft 259 in turn drive other pinions, similar to the pinions 258, which mesh with internal teeth of gears similar to the gear 253, the external teeth of which gears mesh with and drive corresponding denominational type wheels 260 in each row of the column-printing mechanism.

The column-printing mechanism in this case is adapted to print the same data simultaneously on the combined statement and ledger sheet of the usual type, as shown in the above-mentioned application of Konrad and Moser, Serial No. 333,046, and also on a journal sheet, as particularly illustrated and described in the above-mentioned Spurlino et al. Patent No. 2,273,510 and as shown in Figs. 17 to 19 herein.

The method of driving the type wheels of the present column-printing mechanism is fully explained in the previously-mentioned Arnold Patent No. 2,141,332 and embodies the application of the well-known principle of driving mechanism disclosed in the above-mentioned Kreider Patent No. 1,693,279.

For the purpose of properly alining the differential mechanism and the type wheels set thereby, there is provided on each of the segments 243 a series of notches 271, engaged by aliner 272, secured to a shaft 273, journaled in the machine side frames 20.

The aliner 272 is disengaged from the notches 271 during the differential setting of the type wheels, and, after they have been set under control of the amount keys 152, through the differential mechanism, the aliner 272 is again moved into engagement with the notches 271 to aline the type wheels during the printing operation.

The plate 249 (Fig. 3) carries a stud 274, which is engaged by a notch formed in the end of a zero elimination operating slide 275, having parallel slots which engage, respectively, a shaft 276, journaled in brackets 277, secured to the base 21, and a rod 278, supported by arms 279 (only one of which is shown), secured to the shaft 276. A spring 280, tensioned between the arm 246 and the plate 249, normally maintains the lower end of the cam slot in said plate 249 in engagement with the stud 248, as shown herein.

Inasmuch as the zero elimination mechanism shown here is similar to and functions precisely like the zero elimination mechanism disclosed in the United States Patent No. 2,141,333, issued December 27, 1938, to Charles H. Arnold, it is believed that a very brief description of this mechanism as shown in Fig. 3 will be sufficient.

The zero elimination slide 275 carries a roller 281, which cooperates with an arcuate surface 282 on a slide-operating arm 283, free on a shaft 285 journaled in the brackets 277. The arm 283 is connected by a hub, free on the shaft 284, to a companion arm 285, which cooperates with a stud 286 in the arm 283 for the next lower denomination. Likewise, the arm 283 for the denomination being described carries a stud 286, which cooperates with the arm 285 for the next higher denomination, and so on.

The stud 286 in the arm 283 for the highest denomination cooperates with an arm similar to the arm 285, which is secured to the shaft 284, said shaft being rocked first clockwise near the beginning of the machine operation and then back to normal position in the same manner as shown in Fig. 5 of the Arnold patent last referred to.

Clockwise movement of the shaft 284 and the arm 285 for the highest denomination is transmitted through the stud 286 to the arm 285 for said highest denomination, and so on down the line through all the denominations, to rock the arm 283, shown here, clockwise to shift the slide 275 rearwardly to disengage the notch in said slide from the stud 274 in the cam plate 249.

Assuming, for example, that a key has been depressed in the amount bank shown in Fig. 3, after the slide 275 therefor has been shifted rearwardly out of engagement with the stud 274, and after the actuator 205 has been positioned under the influence of the depressed key 152, the roller 237 engages the arcuate surface 238 to position the beam 239, the link 242, and the segments 243 and 246 commensurate with the value of the depressed amount key. Prior to the positioning of the segment 243, as explained above, the aliner 272 is rocked clockwise and disengaged from the notches 271 in the segment 243, and, after said segment is positioned under the influence of the beam 239, the aliner is again engaged with the notches 271 to secure the segments 243 and 246 against displacement.

The positioning of the segment 246 moves an arcuate surface 291 thereon into the path of a roller 292 carried by the arm 293 for this particular denomination. Consequently, forward return movement of the slide 275 under the influence of the spring 293 is obstructed, and the slide is retained in its rearward position. The stud 286 in the arm 283 for the denomination shown in Fig. 3 obstructs counter-clockwise return movement of the arm 283 for the next lower denomination, and so on, down the line, to hold the slides 275 for all lower denominations in their rearward positions to retain notches in said slides out of engagement with the studs 274, so that no movement will be imparted to the cam plate 249 when the shaft 276 and the arms 279 are rocked counter-clockwise back to normal position after the segments 246 have been positioned under the influence of the depressed amount keys.

When no key 152 is depressed in the amount bank shown in Fig. 3, or in any of the higher-order amount banks, the segment 246 is positioned at zero, as shown herein, in which position a clearance portion of the segment is opposite the roller 292. This permits forward return movement of the arm 283 and the slide 275 under the influence of the spring 293 to cause the notch in the end of the slide to re-engage the stud 274. After the notch in the slide has been re-engaged with the stud 274, counterclockwise movement is imparted to the shaft 276, the arm 279, and the slide 275 by mechanism similar to that shown in Fig. 4 of the Arnold Patent No. 2,141,333. Counterclockwise movement of the slide 275 rocks the zero elimination cam plate 249 clockwise, causing the cam slot therein, in cooperation with the stud 248, which is held stationary at this time, to rock the segment 251 counter-clockwise against the action of the spring 280 to move the ring gear 253 clockwise from zero position, as shown here, to one position beyond zero, which in this case is a blank or non-printing position.

Clockwise movement of the ring gear 253, through the pinion 258, the shaft 259, and other pinions and ring gears (similar to the pinions 259 and the gears 253, respectively) for this particular denomination moves the type wheels 260 counter-clockwise from zero position to nonprinting positions, so that the zeroes will not be in a position to print. Obviously, zero printing will be eliminated in a like manner in all higher denominations. In other words, the zero elimination mechanism functions, for example, when a key 152 is depressed only in the fourth amount bank, to cause zeroes to print in the three lower denominations and to eliminate the printing of zeroes in the higher denominations.

After the amount differential actuator (Fig. 3) has been positioned under the influence of the depressed amount key 152, the wheels of the selected totalizer are engaged with the corresponding one of two sets of teeth 294 and 295 thereon, after which return movement of the cam lever 221 and the segment 217 causes the arcuate surface 236 on the segment to move beyond the sole of the foot 216 on the latch 215 to permit said latch, under the influence of the spring 219, to drop behind the shoulder 218 and disengage the nose 233 from the notch 234 in the plate 235.

At the same time, a surface on the inner side of the segment 217 engages a stud 296, carried by the actuator 205, and returns said actuator counter-clockwise, in unison with the segment, to zero position. This counterclockwise return movement of the actuator 205 rotates the wheels of the engaged totalizer or totalizers an extent commensurate with the value of the depressed amount key 152 to add or subtract in said totalizer or totalizers the amount represented by the depressed amount key.

If no amount key 152 is depressed, the zero stop pawl 203 (Fig. 3) remains in the path of the spider 204, and, therefore, upon the initial movement of said spider 204 and the actuator 205, the zero stop pawl 203 is engaged by an extension of said spider to disengage the latch 215 from the driver segment 217 in zero position, after which the roller 237, cooperating with the beam 239, positions the segments 243 and 246 and associated mechanism in proportion thereto to position the type wheels 260 for this particular amount bank in zero position.

At the end of any type of operation, the actuator 205 (Fig. 3) is always returned to normal position, as shown here. However, the link 242 and the segments 243 and 246, as well as the printing mechanism controlled thereby, remain in their set positions at the end of machine operations and are moved directly from said set positions to their new positions in the succeeding machine operation.

The usual transfer mechanism is provided for transferring digits from lower denominations to higher denominations in adding and subtracting operations. This transfer mechanism is old and well known in the art, and therefore no description thereof is given herein. If a description is wanted, reference may be had to the above-mentioned Shipley Patent No. 1,619,796.

*Indicators*

The ring gears 253 (Fig. 3), driven from the main differentials, and other ring gears, to be described later, which are driven under the control of the transaction keys, operate gears 297, to which are secured indicators 298 (Fig. 2), so that each transaction is visibly displayed to the operator as it is entered into the machine.

*Totalizers*

As previously explained, the machine embodying this invention has two lines of totalizers, including an upper or No. 1 totalizer line and a back or No. 2 totalizer line. The No. 1 totalizer is a balance totalizer, often referred to as a "crossfooter," and comprises denominational sets of plus wheels 300 (Figs. 3 and 4) and denominational sets of minus wheels 301, said plus and minus wheels of each denominational order being reversely geared together, so that when one wheel is turned in one direction, the other turns in the opposite direction, and vice versa.

The No. 2 or back totalizer line (Figs. 3 and 4) has thereon two add-subtract totalizers, one for storing the amounts represented by the value of the checks and the other for storing the totals of the deposits, the add-subtract feature being necessary in each case for check and deposit corrections in the case of errors.

The add-subtract totalizer for the storing of check totals comprises adding wheels 302 and subtracting wheels 303 (Fig. 4), which are geared together for reverse movement in exactly the same manner as the No. 1 or balance totalizer wheels, explained above. It should be noted that, in the check totalizer, the relative positions of the "add" and "subtract" totalizer wheels 302 and 303 are the reverse of those usually shown in this form of totalizer.

This is an expedient employed in the present machine to effect adding into the "check" totalizer when subtracting from the balance totalizer on the No. 1 line, and to subtract from the "check" totalizer when adding into the balance totalizer on the No. 1 line to make corrections.

The deposit totalizer comprises adding wheels 304 and subtract wheels 305, which likewise are geared together for reverse movement. In addition to the two adding and subtracting totalizers, the No. 2 totalizer line incudes a set of adding wheels 306, for the storing of the positive totals of the new balances, and a set of adding wheels 307, for the negative totals of the new balances.

In new balance operations, if a balance totalizer contains a plus amount, the plus side of said balance totalizer (wheel 300) will be reset, and the amount thereon will be simultaneously transferred to the wheel 306.

On the other hand, if the balance totalizer contains a negative amount, its minus side (wheel 301) will be reset, and the amount thereon will be transferred to the wheels 307 of the No. 2 totalizer line.

The No. 1 totalizer line and the No. 2 totalizer line are mounted in shiftable frameworks 308 and 309, respectively (Fig. 3), of the type shown and described in the above-mentioned Shipley and Goldberg patents. These frameworks 308 and 309 slide on the shafts 383 and 384, respectively, for the purpose of selecting the different totalizers for actuation and for selecting the plus or minus sides of the add-subtract totalizers or cross-footers.

The means for engaging the No. 1 totalizer line and the No. 2 totalizer line with, and disengaging them from, the amount actuators 205 is also fully shown and described in the above-mentioned Shipley and Goldberg patents, as well as in the previously-mentioned patent to Spurlino et al., No. 2,375,594.

*Transfer total mechanism*

Inasmuch as it is desirable to transfer amounts from a balance totalizer to a selected one of the two adding totalizers on the No. 2 line in new balance operations, special means is provided to control the engaging and disengaging movement of the No. 2 totalizer line. Such mechanism is fully illustrated and described in the above-mentioned Spurlino et al. Patent No. 2,375,594, to which reference is hereby made for a complete understanding of this particular mechanism.

The lateral shifting of the No. 1 balance totalizer to select the plus or the minus side thereof for engagement with the amount actuators is controlled by a shifting cam 326, shown diagrammatically in Fig. 4, and the lateral shifting of the No. 2 totalizer line to select the plus or minus side of the two add-subtract totalizers thereon, as well as the two adding totalizers thereon, is controlled by a shifting cam 327, also shown diagrammatically in Fig. 4.

The two shifting cams 326 and 327 are secured in fixed relationship to each other, and the positioning of the two shifting cams is controlled by the transaction bank of keys 151 to 162 inclusive (Figs. 1 and 6).

*First transaction bank differential mechanism*

The manner in which the cams 326 and 327 (Fig. 4) are positioned by the differential mechanism associated with the transaction keys is disclosed in the Shipley and Goldberg patents hereinbefore referred to. Therefore, it is believed that a brief description of this mechanism, in conjunction with Fig. 6, will be sufficient for the purpose of this specification.

All of the transaction keys except the overdraft key 158 operate the micro-switch 85 (Fig. 5) to in turn control the circuits which cause an operation of the machine release solenoid 47, show in Fig. 14.

During posting operations, when an overdraft occurs in the balance totalizer on the No. 1 line, it is necessary to operate the overdraft key 158 in conjunction with one of a certain group of keys in the total row—namely, the new balance key 163, the sub-balance key 164, the indicator balance key 165 and the new balance NT key 168, which are motorized keys—in order to operate the machine.

All of the transaction keys control the positioning of the transaction differential mechanism shown in Fig. 6. However, only the deposit key 157, the deposit correction key 155, the check key 159, and the check correction key 161 are effective in check-posting operations to select the corresponding sides of the two add-subtract totalizers on the No. 2 totalizer line. As previously explained, the two adding totalizers (wheels 306 and 307) on the No. 2 totalizer line, for storing the total new balances, plus and minus, are not engaged with the amount actuators in check-posting operations but are engaged therewith only in new balance operations to store the amount of the new balance.

The transaction differential mechanism controlled by the transaction keys, in addition to selecting the totalizers on the No. 2 line corresponding to said keys, and selecting the proper side of the balance totalizer for engagement with the amount actuators, also controls the positioning of the type wheels for recording characters, representative of the type of operation being performed, adjacent the amount recorder.

Depression of any one of the transaction keys, except the overdraft key 158, will project its lower end into the path of movement of means associated with a differential latch 341 to disengage said latch in a position corresponding to the position of the key which has been depressed. This means, as well as the mechanism associated therewith, will now be described.

The drive shaft 60 carries a pair of cams 330 (Fig. 6), which coact with rollers on a Y-shaped lever 331, pivoted on a stud 32 mounted in the left-hand one of a pair of plates 333 (only one of which is shown) supported by the rods 208 and 209. The lever 331 is connected by a link 334 to a driving segment 335, rotatably mounted in an old and well-known manner.

The forward end of an arm 328 has a slot 336, through which projects a stud 337 in the forward extension of a bell crank 338 pivoted on a differentially-adjustable arm 339, freely mounted on the rod 210. Pivotally mounted on the vertical arm of the bell crank 338 is an arm 340, which is also pivoted to the upper end of the latch 341, which in turn is pivoted on the differentially-adjustable arm 339. The latch 341 has a foot 342, normally held in contact with the periphery of the driving segment 335, just above a shoulder 343 thereon, by means of a spring 344. In adding operations, the main shaft 60 and the cams 330 make one clockwise rotation, causing the lever 331 to rock the driving segment 335 first clockwise and then counter-clockwise back to normal position. This clockwise movement of the segment 335 causes the shoulder 343, cooperating with the foot 342 of the latch 341, to carry the latter, together with the arms 339 and 328, clockwise in unison until a rounded surface 345 of the bell crank 338 strikes the lower end of the depressed transaction key. This rocks the bell crank 338 and, through the arm 340, the latch 341 counter-clockwise to disengage the foot 342 from the shoulder 343 to arrest the clockwise movement of the arms 328 and 339 in positions corresponding to the depressed transaction key.

Disengagement of the latch 341 moves an extension 346 of the arm 340 into engagement with the corresponding one of a series of notches 347 in a plate 322, secured between the rod 208 and an upper extension of the plate 333. This maintains the differentially-adjustable arm 339 in the adjusted position.

After the latch 341 is disengaged from the shoulder 343, an arcuate surface 348 on the segment 335 moves opposite the foot 342 to maintain the latch 341 in its set position by positively retaining the extension 346 of the arm in engagement with its associated notch 347.

When the lever 331 reaches the terminus of its clockwise movement, a roller 349 thereon coacts with an arcuate surface of the usual minimum-movement beam 350, pivoted at one end to the differentially-adjustable arm 339 and bifurcated at its other end to engage a stud 351 in a link 352, and forces said beam upwardly to position the link 352 in proportion to the position of the transacton key depressed. The upper end of the link 352 is pivoted to a segment 353 secured to one of the tubes 244 on the shaft 245, while the lower end of the link 352 is pivotally connected to a segment arm 354 freely mounted on the shaft 247.

The arm 354 is connected by a link 355 to an arm 356 secured to the shaft 252. Also secured on the shaft 252 is a segment gear 362, which meshes with the external teeth of an external-internal ring gear 357 rotatably mounted on a disk, which in turn is supported by the shaft 255.

The ring gear 357 meshes with other internal gearing (not shown in this application), which in turn drives pinions and other internal gears to set up type wheels 361, associated with this transaction bank, so that a character indicating the type of transaction being performed will be recorded on the record material.

The tube 244 (Fig. 6), which is driven by the gear segment 353, is connected to another gear segment (not shown), which in turn is connected by a link to the totalizer line positioning cams 326 and 327 (Fig. 4) to cause said cams to be positioned in relation to the depressed transaction keys. As previously stated, the cams 326 and 327 are secured together, so that they move like extents when adjusted as just described.

The numbers 0 to 9 inclusive, opposite the horizontal lines in the diagrammatic view of the totalizer-selecting cams 326 and 327 (Fig. 4), indicate the positions to which these cams are adjusted under control of the various transaction keys. For example, the "1" position (Fig. 4) represents a position which is automatically selected under control of the overdraft automatically operated and controlled mechanism, which functions when the new balance key 163 is depressed to clear the new balance totalizer when that totalizer contains a negative new balance. This operation, upon depression of the new balance key 163, simultaneously transfers the negative balance to the total new balance minus totalizer 307 (TNB—). As mentioned before, the overdraft key 158 does not cause an operation of the microswitch 85, and therefore, upon depression of this overdraft key itself, the release shaft 30 will not be released; consequently the machine cannot be operated. Therefore, when depressing the overdraft key, it is necessary also to depress one of the keys 163, 164, 165, or 168 in the total row, in order to release the machine for operation.

When this occurs—that is, when the upper totalizer has an overdraft therein—it controls mechanism to arrest the differential latch associated with the first transaction bank in the first position to select the minus side (wheel 301) (Fig. 4) of the balance totalizer on the No. 1 line and the total new balance totalizer (wheel 307) on the No. 2 totalizer line.

In this present machine, when an overdraft occurs, mechanism is provided, as has been previously mentioned, to prevent the new balance key from being depressed without first depressing the overdraft key 158. In other words, the machine is locked against release by the new balance key, and therefore, as above mentioned, it becomes necessary to depress the overdraft key 158 in order to take the new balance when such new balance is an overdraft.

The mechanism controlled by the balance totalizer on the upper or No. 1 line, to control the first transaction bank differential mechanism, will now be described.

Integral with the previously-described arm 328, which, it will be recalled, is connected to the differentially-adjustable arm 339, through the medium of the bell crank 338 and the stud 337, and consequently is differentially positioned therewith, is a segmental plate 371 (Fig. 6) having a notch 372, in a position which corresponds to the "1" position of differential adjustment of the arm 339 and the arm 328.

Since the segmental plate 371 is integral with the arm 328, this plate receives differential movement in adding operations normally under the control of the keys 154 to 162, except the key 158, which is the overdraft key.

As above mentioned, whenever there is an overdraft in the crossfooter on the upper or No. 1 totalizer line, it is necessary to select the minus side of this totalizer, so that the amount of the overdraft may be printed on the record media. To control the printing mechanism from the minus side of the totalizer, it is necessary to select the No. 1 position on the cam 326 which corresponds to the position of the notch 372 in the differential plate 371. Therefore, it is necessary to control the positioning of the plate 371 and the arm 328 under control of the automatic overdraft mechanism whenever the upper totalizer is in a negative or overdrawn position when the operator is to take a new balance. As above mentioned, when this totalizer is in an overdrawn condition—or, in other words, carries an overdraft—the new balance key 163 will not, when depressed, release the machine for operation; therefore, it is necessary to depress the overdraft key 158 first in order to unlock the new balance key 163. This mechanism for releasing the new balance key will be described later. However, in connection with the overdraft control mechanism of the differential associated with the first transaction bank, there is secured to a rod 399, which is carried by the previously-described hangers 333, an arm 373, carrying a stud 374 (Figs. 6 and 12). The arm 373 also has a stud 375, normally engaged by a hook arm 376 secured on a hub or sleeve 377, which is journaled on a shaft 412 supported by the left side frame 20 and one of the hangers 333.

This hook arm 376, by its engagement with the stud 375, normally holds the stud 374 out of the path of movement of the shoulder 372 on the differentially-adjustable plate 371, which, as above mentioned, is associated with the first transaction bank.

However, when an overdraft occurs, the hook arm 376 is rocked clockwise by means to be described hereinafter, thus releasing the stud 375, whereupon the arm 373 is rocked counter-clockwise (Figs. 6 and 12) under control of the overdraft mechanism, to position the stud 374 in the path of movement of the shoulder 372 on the differential plate 371.

As above mentioned, this shoulder 372 is in a position corresponding to the "1" position of the differential mechanism of the first transaction bank, and therefore, when the stud 374 has been moved into the path of the shoulder 372 by and under the influence of the overdraft mechanism, the differential mechanism of the first transaction bank is stopped in the "1" position, thereby selecting the minus side 301 of the upper totalizer or crossfooter.

*Overdraft control*

Means under control of the crossfooter, to cause the machine to be locked to prevent an operation thereof by the depression of the new balance key when an overdraft is in the crossfooter on the No. 1 or upper totalizer line, will now be described.

Secured to the side of a higher order wheel 300 (Figs. 13 and 15) on the plus side of the balance totalizer is a disk 402, having a node 403 on its periphery. In subtracting, the balance totalizer is shifted from the position shown in Fig. 13 toward the left, where the minus wheel 301 is engaged with the amount differential actuator 205, and is rotated clockwise, which imparts a counter-clockwise movement to the plus wheel 300, to rotate the latter reversely, as is well known, so that the highest order plus wheel passes from 0 to 9 when an overdraft occurs.

When the plus wheel 300 passes from 0 to 9 in an overdraft, the disk 402 will be rotated counter-clockwise (Fig. 15), whereupon the node 403 will coact with a projection 437 on an arm 407 to rock the latter clockwise.

The arm 407 is secured by a hub 406 to a second arm 405, both of said arms and the hub being supported on a rod 408 (Fig. 15), carried at one end by a hanger plate 329, like the hanger plates 207 for the highest order, and at its other end by a bracket 409, also secured to the plate 329. Carried by the arms 405 and 407 is a rod 410, embraced by an arm 411, secured to a shaft 412.

It will thus be seen that both arms 405 and 407 will be rocked clockwise as a single unit, at which time the rod 410, coacting with the arm 411, will rock the latter and the shaft 412 clockwise. An arm 415 (Figs. 7 and 13), pivoted on the rod 390, carries a pin 417, embraced by one arm of a lever 418, loosely mounted on the previously-described shaft 77. The other arm of the lever 418 coacts with a stud 420 on a bar 421, slidably mounted on a stud 422 at one end, and pivoted at its other end to an arm 423, which in turn is pivoted on a stud 424. Both of the studs 422 and 424 are carried by the transaction key frame 66.

The control bar 421 has an angular projection 426 (Fig. 7), normally held against the pin 61 of the overdraft key 158 by a spring 427. A spring 428, connected to the lever 415, normally holds the upper end of the lever 418 in contact with the pin 420 of the control bar 421.

As has been previously explained, whenever the machine is in an overdrawn condition—that is, whenever the balance totalizer on the No. 1 line has an overdraft therein—and the operator attempts to operate the machine by the depression of the new balance key, the machine will not be released because it has been locked by the overdraft in the balance totalizer.

Therefore, to determine, if desirable, how much the overdraft is, the operator may depress the overdraft key 158, which is retained in its depressed position by the previously-described detent 71 (Fig. 6), and then the operator may depress the "indicate balance" key 165, which is fully illustrated and described in the above-mentioned Spurlino et al. Patent No. 2,373,510, causing the amount of the overdraft to be indicated on the indicator wheels 298 (Fig. 2).

This depression of the overdraft key 158 moves the control bar 421 to the left and rocks the lever 418 counter-clockwise, which rocks the lever 415 clockwise.

The clockwise movement of the lever 415, through its stud 417, effects the control of the overdraft locking mechanism, which locks the key release shaft 30 in a manner to be described hereinafter.

To aline the arms 405 and 407, a plunger 433 (Fig. 15) is slidably mounted in a lug 434 on the bracket 409. The upper end of the plunger 433 has a notched head, which engages a stud 435 carried by the arm 405. A spring 436, wound around the plunger 433, and compressed between the lug 434 and the head on the plunger, constantly maintains the plunger in engagement with the stud 435. When the arms 405 and 407 are rocked clockwise, the plunger 433 will rock counter-clockwise about its support a distance commensurate with the full extent of clockwise movement imparted to said arms, in which moved position the plunger 433 will retain said arms until the overdraft is removed from the balance totalizer.

When the overdraft is removed from the balance totalizer, the totalizer is again shifted toward the left (Fig. 13), if not already in such position, in an old and well-known manner, so as to engage the minus side of the wheels of the totalizer (wheel 301) when the totalizer is moved into engagement with the differential actuators 205. Such shifting of the balance totalizer will again position the disk 402 so that the node 403 thereon will be opposite a projection 437 of the arm 407. After the balance totalizer has been moved into engagement with the differential actuators 205 and the minus wheel 301 is moved counterclockwise thereby, the disk 402 will move clockwise therewith, and, since at this time the projection 437 on the arm 407 is in its clockwise, or overdrawn, position, as shown in Fig. 15, the node 403 on the disk 402 cannot strike the node 437.

During the negative balance operation, the minus wheels 301 are all reset to zero, and the plus wheels 300 are all set to 9. During the first adding operation following a negative balance operation, the totalizer wheels are shifted to the right, as viewed in Fig. 13, whereupon the node 403 of the disk is lined with the projection 404 of the arm 405. During the first adding operation following a negative balance operation, the highest order wheel 300 passes from 9 to 0 by reason of the tens transfer mechanism being tripped across the totalizer. When the highest order wheel plus passes from 9 to 0, the node 403 engages a projection 404 to rock the arms 405 and 407 counterclockwise back to the position shown in Fig. 15 and through the rod 410 impart a like movement to the arm 411 and the overdraft shaft 412.

The usual and well-known fugitive 1 mechanism is operated by the shaft 412 when rocked by the disk 403 in the manner shown and described in the above-mentioned Goldberg Patent No. 2,175,346, or in the Shipley Patent No. 1,791,907, so that the true negative balances may be printed.

When an overdraft occurs in the balance totalizer, and the overdraft shaft 412 (Figs. 8 and 12) is rocked clockwise, as previously described, the hook arm 376, which is secured to the sleeve or hub 377, is rocked clockwise to release the arm 373 in the manner previously mentioned to control the differential mechanism in the first transaction bank so that it will be stopped in the No. 1 position whenever an overdraft is in the balance totalizer.

In order to impart to the hook arm 376 a greater clockwise movement than that which the shaft 412 receives at this time, an indirect drive between said shaft 412 and said arm 376 is provided, which includes an arm 467, which is secured to the shaft 412. The arm 467 engages a pin 468 in another arm 469, free on the rod 390. The arm 469 engages a pin 470 in the arm 376.

Secured to the previously-described hub 377, which is, as above described, secured to the hook arm 376, is another hook arm 466 (Figs. 6, 8, and 13). This hook arm 466 is normally engaged with a stud 471 on a lever 472, freely mounted on the rod 390. A spring 473 constantly tends to rock the arm 472 counter-clockwise but is normally prevented from doing so by the engagement of the hook arm 466 with the stud 471. The lever 472 carries a long stud 474, to which is pivoted one end of a link 451. The other end of the link 451 is pivoted to an arm 475, which is connected by a hub to an arm 476. The arms 475 and 476 are pivotally mounted on the shaft 77. The arm 476 (Fig. 8) is provided with a surface 477, which is normally out of the path of movement of a lug 478 on an arm 479, which is secured to the machine release shaft 30.

The arm 472 (Figs. 8 and 10) also carries an angle-sided stud 452, normally engaged by a shoulder 453 of an arm 454 pivoted on the shaft 77. A spring 455 normally retains the arms 454 in the position shown in Fig. 10. The arm 454 carries a stud 456, cooperating with a finger 457 on the previously-described arm 111, which is pivoted on the shaft 77. Also secured on the shaft 390 is an arm 480, having a square stud 481, held in contact with a shoulder 482 on a previously-described arm 113 by means of a spring 483 connected to the arm 480.

Since the arm 113 is integral with the finger 457, the spring 455 (Fig. 10), through the stud 456 and the finger 457, also retains the arm 113 in contact with the square stud 481.

When the hook arm 466 is released from the stud 471 (Fig. 8) and the arm 376 is released from the stud 375 (Fig. 12), the springs 473 and 483 cannot function at that particular time due to the fact that the arms 454 and 113 prevent such functioning of the springs 473 and 483. In other words, the arms 472 and 480 are retained in the positions shown in Figs. 8 and 9, respectively.

As previously described, the arm 111 embraces the stud 110 on the operating bar 102 (Fig. 9) mounted in the total key bank. Each of the keys 163 to 168 inclusive, as above mentioned, carries a stud 90, and, upon depression of any one of the keys 163, 164, 165, and 168, its stud 90 coacts with the cam surface 100 on the bar 102 to cam the latter downwardly against the action of the spring 104, as has been previously described. Such downward movement of the bar 102 rocks the finger 457, causing it to contact the stud 456 and rock the arm 454 counter-clockwise and disengage its shoulder 453 from the stud 452.

The depression of one of the above-mentioned total keys also rocks the arm 113 counter-clockwise and disengages the shoulder 482 from the stud 481 in the arm 480.

Thus, with both arms 454 and 113 released from their respective studs 452 and 481, the springs 473 and 483 can function to rock the arms 472 and 480 counter-clockwise. Such counter-clockwise movement of the arm 472, through the link 451, rocks the arm 476 and positions the shoulder 477 in front of the lug 478 on the arm 479, thus preventing any clockwise movement or machine-releasing movement of the machine release shaft 30. The counter-clockwise movement of the arm 480 rocks the shaft 390 counter-clockwise and consequently rocks the arm 373 (Fig. 12) counter-clockwise, positioning the stud 374 in the path of the shoulder 372 on the differentially-adjustable plate 371 to control the first transaction differential to automatically be stopped in the first position because of the fact that there is an overdraft in the balance totalizer.

However, if the overdraft key 158 is first depressed, before operation of any of the total keys 163, 164, 165, and 168, the stud 417 of the arm 415 will be so positioned as to coact with a surface 491 of the arm 476, thereby permitting clockwise movement of the arm 479 and the shaft 30 to release the machine for operation.

Since the total keys 166 and 167 exercise no control over the No. 1 totalizer line, the bar 102 is cut away, so that upon depression of either one of these keys the studs 90 thereon will be no camming action on the bar 102.

Near the end of the operation of the machine, the release shaft 30 is given a counter-clockwise movement, as previously described. When this occurs, an arm 492 (Figs. 6 and 10), secured to the shaft 30, will, through a pitman 493, which engages the stud 452 on the arm 472, rock said arm 472 sufficiently clockwise to again engage the stud 452 with the shoulder 453 and the arm 454.

At the same time, an arm 495 (Fig. 7), secured to the machine release shaft 30, through a pitman 496 engaging a stud 497 in an arm 498, which is secured to the shaft 390, rocks the shaft 390 clockwise a distance sufficient to cause the arm 480 to be moved far enough, whereupon the stud 481 is again placed beneath the shoulder 482 of the arm 113. Such clockwise movement of the shaft 390 also restores the arm 373 to its normal position, so that the stud 374 is out of the path of movement of the shoulder 372 on the differentially-adjustable plate 371.

This arm 495, the pitman 496, and the arm 498 also have another function. During adding or posting operations, this pitman 496 retains the member or arm 480 in its normal position until the machine trips to prevent adding on the minus side when a plus amount is entered into the cross-footer. This would be due to a partial depression of the total key, which would release the arm 480 and allow the arm 373 to position the stud 374 in the path of the shoulder 372 of the plate 371 to cause the first differential bank to engage with the minus side of the totalizer, and, therefore, to prevent this, the arm 498 is held in the position shown by the pitman 496 until the machine release shaft 30 is rocked in its releasing position to release the machine for operation.

Near the end of the operation of the machine, the machine release shaft 30 is given a counter-clockwise movement, as previously described, and, when this occurs, the arm 492, secured to the shaft 30, will, through the pitman 493 and the stud 452, rock the lever 472 and the arm 480 sufficiently clockwise to engage the stud 452 with the arm 454. At the same time, the pitman 496 will rock the arm 498 and consequently the shaft 390 and the arm 480 clockwise a sufficient distance to engage the stud 481 with the surface 482 of the arm 113. Upon counter-clockwise movement of the shaft 412 to its normal position, the hook arm 466 will again engage the stud 471 on the lever 472, and the hook arm 376 will again engage the stud 375 on the arm 373.

*Machine lock control*

The present machine is arranged so that, immediately after performance of an old balance pickup operation, or an overdraft pickup operation, the balance pickup key 162 (Figs. 1 and 6) and the overdraft pickup key 154 will be locked against operation until the new balance key 163 is depressed to complete the posting of another individual checking account. With such an arrangement, a certain definite series of machine operations may be easily followed in the posting of each checking account. Means for accomplishing this result will now be described.

Associated with the transaction bank of keys in row 1 (Fig. 11) is a locking bar 310, carried by a pair of arms 311 and 312, pivoted to the transaction key frame 66. The bar 310 has formed integral therewith upwardly-extending projections 313 and 314, which in the normal position are located in the paths of movement of the pins 69 on the balance pickup key 162 and the overdraft pickup key 154, respectively (Fig. 1), thereby rendering said keys inoperable.

Manually-operable means is provided for releasing the overdraft pickup key 154 and the balance pickup key 162 for operation when necessary. This means includes a lever 169 (Figs. 1, 6, and 11), which is pivoted to the key frame 66 and has pivoted thereto, by means of a stud 315, the upper end of a bar 316, the lower end of which is pivoted to an arm 317, which in turn is pivoted to the key frame 66.

To release the overdraft pickup key 154 and the balance pickup key 166, the lever 169 is manually moved clockwise (Fig. 11) to move the bar 316 downwardly, whereupon a lug 320 on the bar 316 contacts a pin 321 on the bar 310 and moves the bar 310 downwardly against the action of a spring 322 to move the projections 313 and 314 out of the paths of movement of the pins 69 on the balance pickup key 162 and the overdraft pickup key 164, respectively.

When the lever 169 is again moved forwardly into the position shown in Fig. 11, the bar 316 is moved upwardly, and the spring 322 causes the stud 321 to follow the lug 320 on the bar 316, thus again positioning the lugs 313 and 314 beneath the pins 69 of the balance pickup key 162 and the overdraft pickup key 154, respectively.

As previously mentioned, when a new balance operation is performed, the balance pickup key 162 and the overdraft pickup key 154 are rendered operable for the next succeeding operation of the machine, preparatory to posting a new checking account. The manner in which this is accomplished will now be described.

The total control plate 141, a portion of which is shown in Fig. 11, is shown in its add position. This plate 141 receives a differential movement under control of the keys 163 to 168 inclusive, as has been fully described and illustrated in the above-mentioned Goldberg Patent No. 2,175,346. This plate 141 is provided with an irregularly-shaped cam slot 323, coacting with a roller 324, carried by an arm 325, freely mounted on the shaft 390. Loosely mounted on the shaft 77 is a lever 364, the lower arm of which is bifurcated to engage the roller 324, while the upper arm of said lever coacts with a stud 365, which is carried by the arm 311.

When the new balance key 163 is depressed and the total control plate 141 (Fig. 11) is rocked clockwise, as described in the above-mentioned Goldberg patent, to a position corresponding to said key, the roller 324 will be moved by the cam slot 323, which will rock the lever 364 counter-clockwise, at which time the upper end of the lever will coact with the stud 365 to rock the arm 311 clockwise, thereby moving the bar 310 downwardly to move the projections 313 and 314 from beneath the pin 69 of the balance pickup key 162 and the overdraft pickup key 154, respectively, thus rendering those keys operable.

Since the total control plate 141 remains in its adjusted position until the next operation of the machine, the balance pickup key 162 and the overdraft pickup key 154 will thus remain operable for the next succeeding operation. However, if no total key is depressed in the total row during this next operation, the total control plate 141 will, upon said next operation of the machine, return to its normal add position, which is shown in Fig. 11, whereupon the balance pickup key 162 and the overdraft pickup key 154 will again be locked against operation.

If, on the other hand, the new balance NT key 168 in the total row is depressed, means is controlled thereby for releasing the balance pickup key 162 and the overdraft pickup key 154 for the next operation, just as is done when the new balance key 163 is depressed. Depression of the new balance NT key 168 will control the clockwise movement of the total control plate 141, so that the extreme left-hand end of the cam slot 323 will act on the roller 324, thus rocking the lever 364 counter-clockwise to move the locking bar 310 downwardly to render the overdraft pickup key 154 and the balance pickup key 162 operable in connection with the next operation of the machine. Upon the next operation of the machine, if no key in the total row is depressed, the total control plate 141 will again return to its normal add position, as viewed in Fig. 11, which will in turn cause the locking bar 310 to return to its normal effective position.

If, during a normal posting operation, after the posting or entering of the checks and deposits, the operator depresses the new balance key 163, and the crossfooter should have an overdraft or credit balance therein, the machine, as above described, will not be released, even though the new balance key 163 has been depressed. However, the retaining detent 91 (Figs. 9 and 16), associated with the total keys, will retain the new balance key 163 in its depressed position, and therefore it becomes necessary to release this key, so that the proper key—namely, the overdraft key 158—may be depressed prior to the depression of the new balance key 163 in order to unlock the machine release shaft 30 by removing the lock arm 476—477, shown in Fig. 8, as has been previously described.

In order to do this, the mechanism shown in Fig. 16, which is old and well known in the art, is provided. The operator moves a knob 521 downwardly (Fig. 16). This knob is connected to a lever 522, pivoted at 523 to the machine frame 20. Pivoted to the lever 522 is a link 524, having a slot 525, into which projects a pin 526 of an arm 527, secured to the machine release shaft 30.

Downward movement of the lever 522 by the knob 521, through the link 524 and the pin 526, rocks the arm 527 and consequently the machine release shaft 30 counterclockwise, whereupon an arm 528, which is secured to the machine release shaft 30, and carries a pin 529, rocks an arm 530 clockwise. This arm 530 is pivoted on the shaft 77 and is connected by a bail 531 to a forked arm 532 also pivoted on the shaft 77. The forked arm 532 engages a stud 533 in a locking bar 534 of the usual type (only a part of which is shown) slidably mounted on the pins 93. This bar 534 carries a pin 535 cooperating with a finger 536 on the retaining detent 92.

Therefore, the clockwise movement of the arm 530 and consequently the arm 533 moves the bar 534 to the right, whereupon the pin 535, by its contact with the finger 536, moves the detent 91 to the right to release the depressed key 163.

When the machine is released for operation, the arm 527 is rocked clockwise (Fig. 16), and a finger 537 thereon enters a notch 538 in the lever 522, thus preventing any movement of the knob 521 and the lever 522 after the machine has been released for operation.

This lever 522 is also used to release any of the amount keys in the machine which might have been erroneously depressed, so that the right keys may be depressed.

*Printer drive*

The printer drive shaft 550 is shown in Fig. 3. This shaft is driven by means of gears 551 and 552, the latter being mounted on a stud 553. The gear 552 meshes with a gear 555 on a shaft 556, which is in axial alinement with the machine-operating shaft 60.

The shaft 556 receives one complete cycle or rotation during adding operations, and said shaft 556 receives two cycles or rotations during totalizing or sub-totaling operations. However, it is necessary that the printer be disabled during the first cycle of all total and sub-total operations, and therefore the drive from the main cam shaft 60 to the printer cam shaft 550 is accomplished by a clutch device which is old and well-known in this art and consists generally of a driving pawl and a driven member, which are not shown in this application. For a full disclosure of a clutch type drive substantially the same as that used in the present machine, reference may be had to the United States Patent No. 2,351,541, issued on June 13, 1944, to Everett H. Placke.

*Printed records*

Fig. 17 shows a facsimile of a portion of the journal sheet, with four different accounts thereon, which sheet is printed during normal posting operations of the four different accounts. This sheet also shows that totalizing operations have been made to tell the operator the total amount of checks that have been posted in these four accounts and the total amount of deposits that have been posted to these four accounts, and also shows the total amount of plus new balances and the total amount of overdraft balances from these four accounts.

Fig. 18 shows a facsimile of a proof, run by a second operator, of the same four accounts shown on the journal sheet of Fig. 17, and shows that nether the first operator, who made the original postings, nor the operator who made the proof run made a mistake, because all of the balances in the balance column at the right for all four of the accounts show zeros, and, therefore, the original posting and the proof run posting were both correct.

Fig. 19 shows a facsimile of a portion of the journal sheet of the same four accounts, wherein the proof run operator made two errors in reposting or proving the four accounts which are shown in Fig. 17.

Take, for example, the first account in Fig. 17 in the normal posting operation. In the pickup column, the amount of $500.00 was the first customer's old balance; there were four checks of $50.00 each charged against his account and a deposit of $100.00 credited to his account; and, when the operator took the new balance by depression of the new balance key 163, the amount of $400.00 new balance was printed.

Now refer to Fig. 18, which illustrates the proof run of this same account by another operator.

As previously pointed out, all balances are picked up in the reverse; that is, if the customer's balance was positive it is picked up as an overdraft on the proof run, and if the customer's balance was an overdraft it is picked up as a plus item on the proof run. Therefore, since the first customer's balance in Fig. 17 shows $400.00 plus, the proof operator picked up this amount as a $400.00 overdraft by the depression of the overdraft pickup key 154, to release the machine.

It might be stated here that the operator makes two necessary adjustments to the machine prior to the taking of the proof run. First, she will press in the overdraft key 158 and move the overdraft key lock 170 from the full-line position to the dot-and-dash-line position shown in Fig. 1, to retain the overdraft key in its depressed position at all times during the proof run. Another adjustment to be made is the moving of the lever 169 (Fig. 11) to the right from the position shown in this figure, to unlock the overdraft pickup key 154 and the balance pickup key 162 by moving the bar 310 downwardly to move the lugs 314 and 313, respectively, out from beneath the pins 69 of the overdraft pickup key 154 and the balance pickup key 162, as has been previously described in detail. The reason for locking the overdraft key in depressed position on these proof operations is to prevent the overdraft lock 476 of Fig. 8 from taking effect, and at the same time to render the machine effective so that, upon depression of the new balance key 163 at the end of the proof run of each customer, the plus and minus sides of the overdraft will be automatically selected through the mechanism shown in Fig. 12, depending upon the condition of the totalizer or crossfooter on the upper or No. 1 line at the end of the proof run of each customer's account. In other words, if the customer's account ends in plus, the plus side of the crossfooter will be selected to take the total therefrom, and, if the customer's account ends up as an overdraft in the proof run, then the minus side of the crossfooter will be selected to have the amount of the overdraft on the proof run printed therefrom.

Also, when the amount of the balance is zero, and the last operation in the proof prior to the taking of the total in the customer's account happens to be on the minus side, then the zeros will be printed from the minus side, and it will show 0.00 OD. This will be also an automatic selection, due to the mechanism shown in Fig. 12 and the mechanism which controls this particular automatic selection of the differential mechanism in connection with the first transaction bank.

As stated above, the customer's new balance is picked up in the reverse order; that is, if his new balance is positive it is picked up as an overdraft, and if it is an overdraft it is picked up positively. Therefore, since the first customer's account ended with a positive amount or positive balance of $400.00, the proof operator sets this up as a $400.000 overdraft on the proof run, as shown in the top of the pickup column in Fig. 18. The customer's old balance of $500.00 is then picked up positively; the four checks of $50.00 each are entered into the machine; and the $100.00 deposit is entered. The operator than takes the total of this customer's account for the proof run, which shows 0.00 OD. This printing is explained as follows: The picking up of the $400.00 as an overdraft selected the minus side of the crossfooter. The $500.00 was then entered as a positive amount, and the crossfooter then contained a $100.00 plus. Then there was $200.00 taken off by reason of the four $50.00 checks, which left this is an overdraft of $100.00. Then the deposit of $100.00 was entered into the machine, which brought the overdraft totalizer to zero, but, since it was still on the minus side, it prints 0.00 OD. However, since the amount is 0.00 OD, it shows that no error was made by the original operator who posted this account, and also that no error was made by the proof run operator of this account.

Referring now to Fig. 19, this same account, which was, we will say for example and for the purposes of illustration, the proof run was made by a proof run operator. In this case she picked up the $400.00 as an overdraft then entered the $500.00 old balance as a positive amount. Three checks of $50.00 were entered, and then a fourth check of $51.00 was entered. This happens to be an error and will show up, as will be pointed out later. After the entry of this check the amount of the $100.00 deposit was entered, and then the operator took the total. This total, as shown in Fig. 19 in the balance column, shows $1.00 OD, or, in other words, a $1.00 overdraft. Now this comes from the fact that an error was made by the operator when she posted the fourth check of $50.00. She made an error and posted it as $51.00, and therefore, the $400.00 overdraft, plus $201.00 overdraft, still leaves a $1.00 overdraft, since there was only a $500.00 plus and a $100.00 deposit entered in the machine. In other words, in this particular posting operation there was $601.00 entered in the minus side of the crossfooter and $600.00 in the plus side of the crossfooter, leaving an overdraft of $1.00. This error can be quickly spotted, because all that is necessary is for the operator to look down in the balance column; wherever the amount does not show 00 it indicates that an error was made somewhere in the posting of some one of the customers' accounts; and by checking back it can be seen that in this particular account the error was made in posting a $51.00 check instead of a $50.00 check.

Now in the second account in Fig. 17, the operator picked up the old balance as $400.00 and entered two checks of $400.00 each and a deposit of $1.00, and, when the balance was taken, it showed an overdraft of $399.00.

In both Figs. 18 and 19, the proof run operator picked up this $399.00 as a positive amount and then entered the customer's $400.00 old balance, which made $799.00. Then the two checks of $400.00 each were entered and the deposit of $1.00 was entered, after which the total of this customer's account was taken, which showed 0.00. This 0.00 in the balance column of Figs. 18 and 19 shows that the proof run operator and also the original posting operator made no error in the posting of this customer's account.

The same is true with the next account, which is the third account on the journal. The balance column of Fig. 17 shows an overdraft of $539.00. In the posting run, the operator picked up this $539.00 as a positive amount and then entered the customer's old balance, which was a $399.00 overdraft, then posted the three $50.00 checks and the $10.00 deposit. This $539.00 plus the $10.00 deposit equals $549.00, and the overdraft set up $399.00 plus $150.00 equals $549.00; therefore, the balance of this third account shows 0.00 in the balance column on both Figs. 18 and 19, showing that the proof run operator and also the original posting operator made no error in the posting and proof running of this particular customer's account.

In connection with the fourth account, which shows a plus balance of $451.00, in Fig. 17 the proof run operator picked up this amount as a $451.00 overdraft and then added the $539.00 overdraft, and then posted the two $5.00 checks and the $1,000.00 deposit. The two overdrafts of $451.00 and $539.00, plus the $10.00 in checks, equal $1,000.00, and therefore the deposit of $1,000.00 offset that. Consequently, when the balance was taken it shows 0.00, and according to Fig. 18 it shows that the proof run operator who made this proof run made no error and also shows that the posting operator made no error on the original posting.

Referring now to Fig. 19, the proof run operator picked up the plus amount as an overdraft of $451.00 and then entered the $539.00 overdraft, after which the two checks of $5.00 each were entered. The proof run operator then entered a deposit of $1,001.00 instead of the correct amount, $1,000.00, and then, when the balance was taken, it showed $1.00 in the balance column, which proves that either the posting operator or the proof run operator made an error, and, by checking back on the journal sheet, it can be seen that the error was made by the proof run operator's posting a $1,001.00 deposit instead of a $1,000.00 deposit.

SUMMARY

From the description and illustration given in connection with the present invention it will be apparent that on normal posting operations, when an overdraft occurs in the balance totalizer or crossfooter on the No. 1 or upper totalizer line, it locks the machine release mechanism, and it is therefore necessary to release the machine by the depression of the overdraft key 158, to release this overdraft lock.

This overdraft lock, as has been previously described, consists mainly of the mechanism shown in Fig. 8, wherein, when the arm 472 is released upon depression of the new balance key 163, the spring 473 rocks said arm 472 counter-clockwise, which, through the link 451, rocks the arm 476 clockwise and positions the surface 477 in front of the lug 478 on the arm 479, which is secured to the machine release shaft 30. Therefore, this shaft cannot be rocked clockwise, which is necessary to release the machine for an operation. Therefore, it is necessary, as above mentioned, to release the depressed and retained new balance key 163 by means of the release lever 522 (Fig. 16) and then depress the overdraft key 158, which, through the mechanism shown in Fig. 7, rocks the arm 415 clockwise, whereupon its pin 417 engages the surface 491 of the arm 478 and rocks the arm 476 counter-clockwise to move the shoulder 477 above the lug 478, so that the machine can now be released by the depression of the balance key 163.

On zero proof operations, this lock is released at all times by locking the overdraft key in depressed position by means of the lever 170, shown in Fig. 1, which, after the key is depressed, is moved to the right or to the dot-and-dash position to hold the overdraft key 158 in its depressed position, whereupon the stud 417 retains the arm 476 in the position shown in Fig. 8, so that the shaft 30 can still be operated notwithstanding the fact that an overdraft occurs. Also during these proof run operations the machine automatically selects the plus or minus side of the crossfooter, depending upon the condition of the crossfooter. In other words, if a positive amount is in the crossfooter, the add side will be selected, and, if a negative amount is in the crossfooter, then the minus side of the crossfooter will be selected. The plus side is selected when the differential mechanism associated with the No. 1 transaction bank shown in Fig. 6 goes to the "9" position whenever no key is depressed in this bank and upon the depression of the new balance key 163 to take the total from the crossfooter at the end of a proof run operation of any customer's account if the crossfooter has a positive amount therein. However, when the proof operator takes the total, if there is an overdraft, the new balance key 163 causes the machine to be released for operation, and the machine will automatically select the minus side of the totalizer at this time. As above mentioned, if the amount is positive, then this differential of the first transaction bank goes to the "9" position and therefore turns the cam 326 (Fig. 4) so that the "9" position is selected, which selects the plus side of the wheel 300 of the crossfooter.

If an overdraft is in the totalizer, then the mechanism of Fig. 12 functions, because, upon an overdraft, the arm 376 is released from the arm 373, and consequently the shaft 390 can be rocked when the new balance key 163 is depressed, because the arm 113 releases the arm 480 of Fig. 9, and the spring 483 rocks the shaft 390 and consequently the arm 373 counter-clockwise, as shown in Fig. 12, and positions the pin 374 in the path of the shoulder 372 on the differential plate 371, which is in the No. 1 or transaction bank, as has been previously described. This shoulder 372 is in a position corresponding to the "1" position of the differential mechanism, which is on the minus side of the cam 326, as shown in Fig. 4, and therefore it will select the minus side of the crossfooter, or, in other words, the wheel 301 will be engaged with the totalizer, and consequently the amount in the crossfooter will be printed from the minus side and under control of the minus side, if an overdraft is in the crossfooter at the end of a proof posting run.

Therefore, it can be clearly seen that by the mechanism involving the invention in this present application the machine has the ability to have a locked credit balance or overdraft, and in the same machine it is possible to have the possibility of automatically selecting the plus side or the minus side of the crossfooter, which is not true in machines shown in the prior patents.

While the form of mechanism shown and described herein is admirably adapted to fulfill the objects primarily stated, it is to be understood that it is not intended to confine the invention to the one specific form or embodiment which is shown herein, but it is susceptible of embodiment in other forms all coming within the scope of the claims which follow.

What is claimed is:

1. In a machine of the class described, the combination of a balance totalizer; totalizer-selecting means for selecting the plus side or the minus side of the totalizer; a differentially-adjustable mechanism for actuating said totalizer-selecting means; a bank of manipulative devices to control said differentially-adjustable mechanism; and means controlled by the algebraic state of said totalizer for superseding the control of the manipulative devices over said differentially adjustable mechanism and for automatically controlling the adjustment of said differentially-adjustable mechanism.

2. In a machine according to claim 1 characterized by the fact that the means controlled by the algebraic state of the totalizer for superseding the control of the manipulative devices over said differentially adjustable mechanism and for automatically controlling the adjustment of said differentially-adjustable means, includes a shoulder on the differentially adjustable means and a member adapted to be moved into the path of movement of said shoulder to the differentially adjustable means, and retaining means normally holding said member in ineffective position, but operated under control of said totalizer to release said member.

3. In a machine of the class described, the combination of a balance totalizer; totalizer-selecting means for selecting the plus side or the minus side of the totalizer; a differentially-adjustable mechanism for actuating said totalizer-selecting means; a bank of manipulative devices to control said differentially-adjustable mechanism; and means intermediate the balance totalizer and said differentially-adjustable mechanism and including a lever having a stop member and a latch adapted to cooperate with said mechanism to control the latter as determined by the algebraic condition of said totalizer.

4. In a machine of the class described, the combination of a balance totalizer; totalizer-selecting means for selecting the plus side or the minus side of the totalizer; a differentially-adjustable mechanism for controlling said totalizer-selecting means; and means including a lever having a stop member and a latch arm to retain the stop member in an ineffective position, said latch arm being controlled by said totalizer when the latter is in a negative condition to release said latch arm thus causing said stop member to engage said differentially-adjustable mechanism to cause the totalizer-selecting means to select the minus side of said totalizer.

5. In a machine of the class described, adapted for use in bank establishments for posting accounts, and for re-posting or proof running said accounts, a balance totalizer; a machine release mechanism; totalizer-selecting means for selecting the plus side or the minus side of said balance totalizer; a differentially-adjustable mechanism for controlling the totalizer-selecting means; means to cause operation of the machine release mechanism and to control the machine to take the balance from said balance totalizer when posting accounts; and a rockable device cooperating with said differentially-adjustable mechanism and controlled directly by the algebraic state of said totalizer for automatically controlling the differential adjustment of said adjustable mechanism when proof running said accounts and upon operation of said second-mentioned means.

6. In a machine of the class described, according to claim 5 characterized by the fact that the rockable device is secured to a shaft which has secured thereto a spring-actuated means; retaining means cooperating with said spring-actuated means; and means operated by the means which causes operation of the machine release mechanism for actuating said retaining means to release the spring-actuated means.

7. In a machine of the class described, adapted for use in bank establishments for posting accounts, and for re-posting or proof running said accounts, a balance totalizer; a machine release mechanism; totalizer-selecting means for selecting the plus side or the minus side of said balance totalizer; a differentially-adjustable mechanism for controlling the totalizer-selecting means; means to cause operation of the machine release mechanism and to control the machine to take the balance from said totalizer when posting accounts; and a device controlled by said totalizer when the latter is in a negative condition for controlling the differentially adjustable mechanism to cause the totalizer-selecting means to cause automatic selection of the minus side of the totalizer upon operation of said second-mentioned means when proof running said accounts.

8. In a machine of the class described according to claim 7 characterized by the fact that the differentially adjustable mechanism for controlling the totalizer-selecting means includes a shouldered member rigidly attached to the differentially-adjustable mechanism to be moved therewith and to control the moving thereof; and wherein the device which is controlled by the totalizer when the latter is in negative condition for controlling the differentially adjustable mechanism to cause the totalizer-selecting means to select the minus side of the totalizer includes a rockable device having a projecting means thereon which is adapted to cooperate with the said shouldered member to control the positioning thereof when the totalizer is in a negative condition.

9. In a machine of the class described, adapted for use in bank establishments for posting accounts, and for re-posting or proof running said accounts, a balance totalizer; a machine release mechanism; totalizer-selecting means for selecting the plus side or the minus side of said balance totalizer; a differentially-adjustable mechanism for controlling the totalizer-selecting means; means to cause operation of the machine release mechanism and to control the machine to take the balance from said balance totalizer when posting accounts; and a device controlled by said balance totalizer when the latter is in a positive condition for controlling the differentially adjustable mechanism to cause said totalizer-selecting means to cause automatic selection of the plus side of the totalizer upon operation of said second-mentioned means when proof running said accounts.

10. In a machine of the class described, adapted for use in bank establishments for posting accounts, and for re-posting or proof running said accounts, a balance totalizer; a machine release mechanism; totalizer-selecting means for selecting the plus side or the minus side of said balance totalizer; a differentially-adjustable mechanism for controlling the totalizer-selecting means; means to cause operation of the machine release mechanism and to control the machine to take the balance from said totalizer when posting accounts; a device controlled by said totalizer when the latter is in a negative condition for controlling the differentially-adjustable mechanism to cause the totalizer-selecting means to select the minus side of the totalizer upon operation of said second-mentioned means when proof running said accounts; and means for retaining said last-mentioned device in an ineffective position until after said second-mentioned means has caused operation of said machine release mechanism.

11. In a machine of the class described according to claim 10 characterized by the fact that the means for retaining the device in ineffective position includes a plurality of latching devices one of which is operated directly under control of the balance totalizer and the other is operated under control of the means which causes operation of the machine release mechanism.

12. In a machine of the class described, adapted for use in bank establishments for posting accounts, and for re-posting or proof running of said accounts, a balance totalizer; a machine release mechanism; totalizer-selecting means for selecting the plus side or the minus side of said balance totalizer; a differentially-adjustable mechanism for controlling the totalizer-selecting means; means to cause operation of the machine release mechanism and to control the machine to take the balance from said totalizer when posting accounts; a device controlled by said totalizer when the latter is in a negative condition for controlling the differentially-adjustable mechanism to cause the totalizer-selecting means to select the minus side of the totalizer upon operation of said second-mentioned means when proof running said accounts; and a plurality of means for retaining said last-mentioned device in ineffective position; means for releasing one of said retaining means under control of the balance totalizer; and means for releasing another of said retaining means under control of said second-mentioned means.

13. In a machine according to claim 12 characterized by the fact that one of said plurality of retaining means is released under control of the balance totalizer when said totalizer is in an overdrawn condition, and the other of said retaining means is released under control of said means which causes operation of the machine release mechanism regardless of the condition of the balance totalizer.

References Cited in the file of this patent

UNITED STATES PATENTS

| | | |
|---|---|---|
| 1,957,501 | Horton | May 8, 1934 |
| 1,992,142 | Butler | Feb. 19, 1935 |
| 2,371,914 | Rauh | Mar. 20, 1945 |
| 2,626,749 | Christian et al. | Jan. 27, 1953 |
| 2,629,549 | Butler | Feb. 24, 1953 |
| 2,639,857 | Spurlino et al. | May 26, 1953 |